US010534538B2

(12) United States Patent
Kogan et al.

(10) Patent No.: US 10,534,538 B2
(45) Date of Patent: *Jan. 14, 2020

(54) FINE-GRAINED HARDWARE TRANSACTIONAL LOCK ELISION

(71) Applicant: Oracle International Corporation, Redwood City, CA (US)

(72) Inventors: Alex Kogan, Needham, MA (US); David Dice, Foxboro, MA (US); Virendra J. Marathe, Florence, MA (US)

(73) Assignee: Oracle International Corporation, Redwood City, CA (US)

( * ) Notice: Subject to any disclaimer, the term of this patent is extended or adjusted under 35 U.S.C. 154(b) by 470 days.

This patent is subject to a terminal disclaimer.

(21) Appl. No.: 15/050,393

(22) Filed: Feb. 22, 2016

(65) Prior Publication Data

US 2016/0246641 A1 Aug. 25, 2016

Related U.S. Application Data

(60) Provisional application No. 62/119,720, filed on Feb. 23, 2015.

(51) Int. Cl.
*G06F 3/06* (2006.01)
*G06F 9/46* (2006.01)
*G06F 9/50* (2006.01)
*G06F 9/52* (2006.01)

(52) U.S. Cl.
CPC .......... *G06F 3/0604* (2013.01); *G06F 3/0629* (2013.01); *G06F 9/467* (2013.01); *G06F 9/5016* (2013.01); *G06F 9/52* (2013.01); *G06F 9/524* (2013.01)

(58) Field of Classification Search
CPC ...... G06F 3/0604; G06F 3/0629; G06F 9/467; G06F 9/5016; G06F 9/52; G06F 9/524
See application file for complete search history.

(56) References Cited

U.S. PATENT DOCUMENTS

| 7,120,762 B2 | 10/2006 | Rajwar et al. |
| 8,190,859 B2 | 5/2012 | Akkary et al. |
| 8,539,486 B2 | 9/2013 | Cain, III et al. |

(Continued)

OTHER PUBLICATIONS

U.S. Appl. No. 15/050,396, filed Feb. 22, 2016, Alex Kogan et al.

*Primary Examiner* — Francisco J Aponte
*Assistant Examiner* — Kevin X Lu
(74) *Attorney, Agent, or Firm* — Robert C. Kowert; Kowert, Hood, Munyon, Rankin & Goetzel, P.C.

(57) ABSTRACT

Concurrent threads may be synchronized at the level of the memory words they access rather than at the level of the lock that protects the execution of critical sections. Each lock may be associated with an array of flags and each flag may indicate ownership of certain memory words. A pessimistic thread may set flags corresponding to memory words it is accessing in the critical section, while an optimistic thread may read the corresponding flag before any memory access to ensure that the flag is not set and that therefore the associated memory word is not being accessed by the other thread. Thus, optimistic threads that do not have conflicts with the pessimistic thread may not have to wait for the pessimistic thread to release the lock before proceeding.

20 Claims, 15 Drawing Sheets

(56) References Cited

U.S. PATENT DOCUMENTS

| | | | |
|---|---|---|---|
| 8,914,620 B2 | 12/2014 | Dice | |
| 9,207,967 B2 | 12/2015 | Riegel | |
| 2006/0053351 A1 | 3/2006 | Anderson et al. | |
| 2007/0136289 A1 | 6/2007 | Adl-Tabatabai et al. | |
| 2010/0138841 A1 | 6/2010 | Dice et al. | |
| 2010/0218195 A1* | 8/2010 | Adl-Tabatabai | G06F 8/458 718/107 |
| 2012/0204163 A1* | 8/2012 | Marathe | G06F 8/4442 717/151 |
| 2012/0254846 A1* | 10/2012 | Moir | G06F 9/467 717/152 |
| 2013/0097391 A1 | 4/2013 | Rajwar et al. | |
| 2013/0159653 A1 | 6/2013 | Pohlack et al. | |
| 2014/0297610 A1 | 10/2014 | Michael et al. | |
| 2015/0026688 A1* | 1/2015 | Dice | G06F 9/467 718/102 |
| 2015/0074366 A1 | 3/2015 | Calciu et al. | |

\* cited by examiner

FINE-GRAINED HARDWARE TRANSACTIONAL LOCK ELISION

This application claims benefit of priority of U.S. Provisional Application Ser. No. 62/119,720 titled "Revised Transactional Lock Elision," filed Feb. 23, 2015, the content of which is incorporated by reference herein in its entirety.

BACKGROUND

Field of the Disclosure

This disclosure relates generally to synchronization mechanisms for use in concurrent programming, and more particularly to systems and methods for implementing transactional lock elision.

Description of the Related Art

Over the past decade, the focus of the computing industry has shifted from making faster computing cores to building systems with more cores per processor chip and more processor chips per system. To continue to benefit from advances in technology, therefore, applications must be able to exploit increasing numbers of cores concurrently. Mutual exclusion locks and monitors represent two traditional concurrent programming synchronization mechanisms. Locks and monitors typically protect shared resources by separating access to them in time. For example, in one implementation, as long as a given thread of execution retains a lock on an object or resource, no other thread of execution may modify the object, and any other thread attempting to modify the object may be blocked from further execution until the lock is released.

However, traditional locking techniques are known to suffer from several limitations. Coarse-grained locks, which protect relatively large amounts of data, often do not scale. For example, threads of execution on a multiprocessor system may block each other even when they do not actually require concurrent access to the same addresses. Fine-grained locks may resolve some of these contention issues, but in traditional locking techniques, this may be achieved only at the cost of added programming complexity and the increased likelihood of other problems, such as deadlocks. Locking schemes may also lead to an increased vulnerability to thread failures and delays—e.g., a thread that is preempted or that performs expensive input/output operations while holding a lock may obstruct other threads for relatively long periods, thereby potentially reducing the overall throughput of the system.

Transactional Memory (TM) is a promising concurrency control technology that aids programmers writing parallel programs to perform correct data sharing between concurrent computations (which commonly manifest as "threads"). Transactional memory is widely considered to be the most promising avenue for addressing issues encountered in concurrent programming and execution. Using transactional memory, programmers may specify what should be done atomically, rather than how this atomicity should be achieved. The transactional memory implementation may then be responsible for guaranteeing the atomicity, largely relieving programmers of the complexity, tradeoffs, and software engineering problems typically associated with concurrent programming and execution. In general, transactional memory may be implemented in hardware, with the hardware transactional memory (HTM) directly ensuring that a transaction is atomic, or as software transactional memory (STM) that provides the "illusion" that a transaction is atomic, even though in fact it may actually be executed in smaller atomic steps by underlying hardware. HTM solutions are generally faster than STM ones, but so-called "best-effort" HTM implementations may not guarantee the ability to commit any particular transaction. Recently developed Hybrid Transactional Memory (HyTM) implementations may allow transactions to be executed using hardware transactional memory if it is available (and when it is effective), or using software transactional memory otherwise.

Traditional Transactional Lock Elision (TLE) generally uses Hardware Transactional Memory (HTM) to execute unmodified critical sections concurrently, even if they are protected by the same lock. To ensure correctness, the transactions used to execute these critical sections "subscribe" to the lock by reading it and checking that it is available. Traditional Transactional Lock Elision may also exploit hardware transactional memory (HTM) to introduce concurrency into sequential code. It achieves this by attempting to execute each critical section protected by a lock in an atomic hardware transaction, reverting to the lock if these attempts fail. A significant drawback of traditional TLE is that it disables hardware speculation once there is a thread running under lock.

SUMMARY

Described herein are various methods, techniques and/or mechanisms for regarding concurrent Transactional Lock Elision (TLE). For instance, in some embodiments, concurrent TLE (or refined TLE) may be implemented so as to allow concurrent execution of speculating threads to execute on HTM along with a thread holding a lock where both threads may access the same portion of shared memory. In some embodiments, allowing concurrent execution of speculating threads to execute on HTM while a thread holds the lock may improve concurrency of the TLE implementation.

Concurrent TLE, according to some embodiments, may increase concurrency in TLE workloads where some threads fail to complete on HTM by allowing concurrent execution of pessimistic and optimistic threads. Concurrently threads may be synchronized at the (fine-grained) level of the memory words they access rather than at the (coarse-grained) level of the lock that protects the execution of critical sections. Additionally, each lock may be associated with an array of flags and each flag may indicate ownership of certain memory words (thereby protecting them from two conflicting accesses). A pessimistic thread may set flags corresponding to memory words it is accessing in the critical section, while an optimistic thread may read the corresponding flag before any memory access to ensure that the flag is not set and that therefore the associated memory word is not being accessed by the other thread.

Thus, optimistic threads that do not have conflicts with the pessimistic thread may not have to wait for the pessimistic thread to release the lock before proceeding (in parallel), according to some embodiments. In some embodiments, the methods, techniques and/or mechanisms may not require modification of user code and may be applicable on systems supporting HTM using standard compilers.

Figure 1:
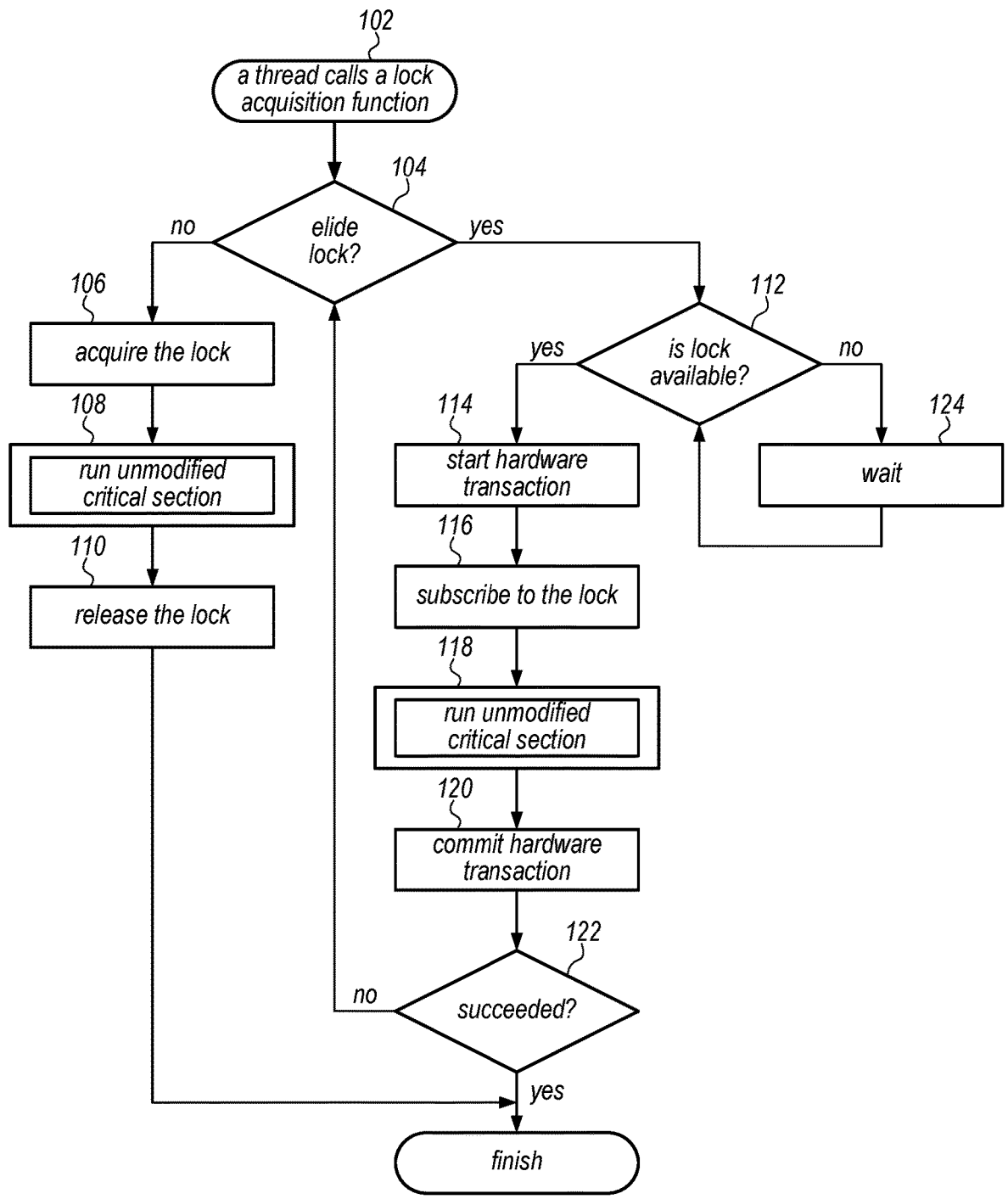
FIG. 1 is a flowchart illustrating one embodiment of a method for transactional lock elision (TLE).

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

This disclosure describes various methods, techniques and/or mechanisms for implementing TLE. For instance, in some embodiments, TLE may be implemented so as to allow concurrent execution of speculating threads to execute on HTM along with a thread holding the lock. In some embodiments, allowing concurrent execution of speculating threads to execute on HTM while a thread holds a lock may improve concurrency of the TLE implementation. In some embodiments, a compiler may generate two execution paths for a critical section, a fast (or un-instrumented) path and a slow (or instrumented) path. As used herein, a thread executing an un-instrumented critical section may be considered to be taking (e.g., executing or running) the fast path while a thread executing an instrumented critical section may be considered to be taking (e.g., executing, running, etc.) the slow path. Additionally, threads, whether taking the slow (i.e., instrumented) or the fast (i.e., un-instrumented) path may also utilize one or more transactions (e.g., via HTM) when executing a critical section. Compared to many full-fledged hybrid transactional memory systems, the methods, techniques and/or mechanisms described here may employ substantially simpler instrumentation.

1. Introduction

Traditional Transactional Lock Elision (TLE) is a technique that may exploit hardware transactional memory (HTM) to introduce concurrency into sequential code. Traditional TLE (e.g., as presented by Rajwar and Goodman in 2001) became practical with the introduction of commercial architectures featuring hardware transactional memory (HTM), such as Intel Haswell™, IBM POWER8™, etc. In some embodiments, it may achieve this by attempting to execute each critical section protected by a lock in an atomic hardware transaction. When a conflict between concurrently running transactions is detected, at least one of the transactions may be aborted. The execution of the corresponding critical section may be subsequently retried, either speculatively (e.g., using another hardware transaction) or pessimistically (e.g., by obtaining and holding the lock). One advantage of TLE may be that it can be enabled by (i.e., at the level of) the library providing lock implementation, making TLE readily applicable on virtually any architecture featuring HTM. For instance, recent Intel Haswell processors are equipped with a special Hardware Lock Elision (HLE) mode that enables traditional TLE by using new instruction prefixes and implementing begin-fail-retry logic on the level of hardware.

In some embodiments, traditional TLE techniques may be able to achieve linear scalability with respect to the number of threads where all or most transactions succeed (i.e., under ideal conditions). However, in more realistic applications, such as when some operations fail to complete on HTM (e.g., due to data conflicts, HTM capacity limits, attempts to execute unsupported instructions, etc.), the performance of traditional TLE may be negatively affected. For instance, performance may suffer because in order to ensure correctness, traditional TLE typically disallows concurrent execution of both speculating threads (e.g., threads using hardware transactions) and pessimistic threads (e.g., threads using lock mechanisms). Thus, once there is a (pessimistic) thread executing under the lock, all other threads (e.g., both speculating and other pessimistic threads) may have to wait for it to release the lock before they can start their speculative executions. This may be true even if the pessimistic and speculating threads do not need access to the same data locations (and therefore may not actually conflict over data access).

In other implementations, TLE may allow more parallelism in cases when hardware speculation fails. For example, software transactional memory (STM) may be used as a fallback instead of pessimistically acquiring a lock. Thus, hybrid transactional memory (TM) systems may allow multiple threads to speculate on both HTM and software paths concurrently provided they all perform any necessarily synchronization steps. While such synchronization steps might be trivial for threads executing on hardware, they may be much more complicated for threads executing on the software path (e.g., utilizing STM). In some embodiments, threads utilizing STM may be required to coordinate access to the shared data among themselves as well as with threads utilizing HTM. In some cases, this may lead to poor performance when multiple threads fail to complete their operations using HTM and switch into the software-only path.

In various embodiments, the methods, techniques and/or mechanisms described herein may improve the performance of TLE by taking a middle ground between TLE and hybrid TM systems. For instance, in some embodiments, speculating threads may be allowed to execute concurrently on HTM while a pessimistic thread holds the lock. In some embodiments, this concurrency may be useful for many interesting cases, while being simpler than full-fledged hybrid TM systems. For instance, metadata used for synchronization of concurrently running threads may be updated only by a thread holding the lock (e.g., executing pessimistically), and may be read only by threads utilizing HTM.

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a flowchart illustrating one embodiment of a method for TLE. As noted previously, TLE may, in some embodiments, be implemented by (or at the level of) a library providing lock implementations. When a thread calls a lock acquisition function, the TLE implementation may decide whether the lock should be elided and if so, may start a hardware transaction after making sure the lock is free. When a thread releases the lock, the TLE implementation may check whether the thread is utilizing HTM and if so, may commit the transaction. Alternatively, if the thread was not utilizing HTM, the TLE implementation may simply release the lock. If the hardware transaction fails for any reason, the HTM implementation may roll back any changes (e.g., to shared memory) that might have been made by the thread as part of the failed transaction and return execution to the point where the TLE implementation determines whether to elide the lock (and start another hardware transaction) or to abandon speculation altogether and acquire the lock.

Thus, as shown in block 102, a thread may call a lock acquisition function prior to executing a critical section. In response to the thread calling the lock acquisition function, the TLE implementation may determine whether the lock should be elided, as shown by decision block 104. If the lock is to be elided, as indicated by the positive output from decision block 104, the TLE implementation may first determine that the lock is available (e.g., that no thread currently holds the lock), as in decision block 112. If the lock is not available, as indicated by the negative output of decision block 112, the TLE implementation, and therefore the thread, may wait for the lock to become available, as shown in block 124.

If the lock is available, as indicated by the positive output of decision block 112, the TLE implementation may start a hardware transaction, as shown in block 114. In some embodiments, the TLE implementation (and/or the executing thread) may subscribe to the lock, as shown in block 116, such as to ensure that the hardware transaction may be aborted in response to acquisition of the lock by another thread. The unmodified critical section may then be executed, as shown in block 118. After completing the unmodified critical section, the TLE implementation may commit (or attempt to commit) the hardware transaction, as in block 120.

If the hardware transaction fails for any reason, as illustrated by the negative output of decision block 122, the HTM implementation may roll back any changes (e.g., to shared memory) that might have been made by the thread as part of the failed transaction and return execution to the point where the TLE implementation determines whether to elide the lock at decision block 104. The TLE implementation may then determine whether to elide the lock again and therefore start another hardware transaction, as shown by the positive output of decision block 104, or to abandon speculation altogether and acquire the lock, as shown by the negative output of decision block 104.

If the lock is to not to be elided (e.g., either initially or after a failed hardware transaction), as illustrated by the negative output of decision block 104, the TLE implementation may acquire the lock, as in block 106, execute an unmodified critical section, as in block 108, and release the lock as shown in block 110. As noted above, when a thread not utilizing a hardware transaction releases the lock, the TLE implementation may simply release the lock, as shown in block 110.

Figure 2:
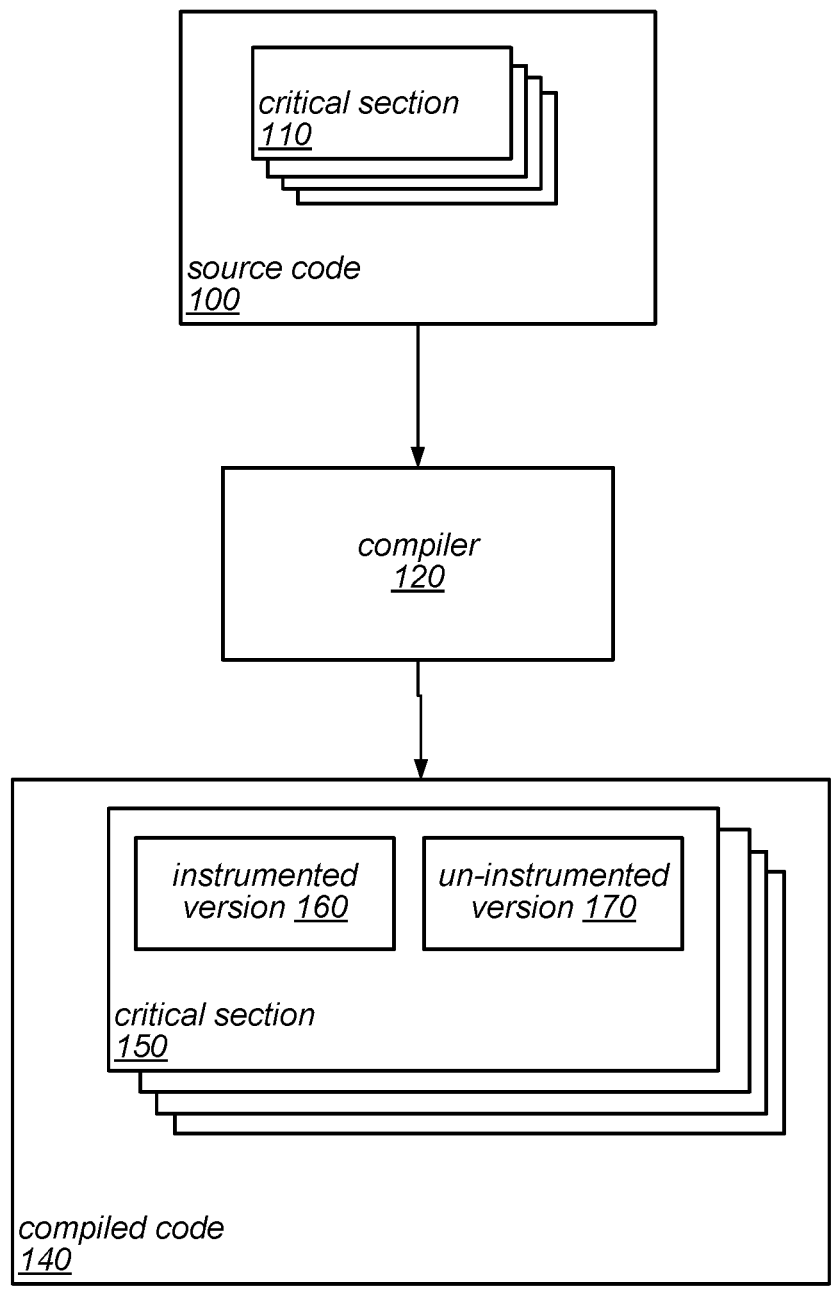
FIG. 2 is a logical block diagram illustrating a compiler configured to implement concurrent transactional lock elision (TLE), according to one embodiment.

As described in detail herein, concurrent TLE may, according to some embodiments, rely on a compiler to generate two execution paths for a critical section, a fast (or un-instrumented) path and a slow (or instrumented) path. FIG. 2 is a logical block diagram illustrating, according to one embodiment, a compiler configured to implement (at least partially) concurrent, TLE as described herein according to one embodiment. As shown in FIG. 1, a compiler 120 may be configured to compiler source code 100 to generate compiled code 140. Compiler may represent any of various types of compilers capable of receiving, analyzing, and/or compiling source code written in any of various programming languages, according to various embodiments. For example, in one example embodiment, compiler 120 may represent the GCC compiler configured to receive and compile source code written in C, C++, Java, or other programming languages. Similarly, compiled code 140 may represent any of various forms and/or formats of compiled code capable of being executed either stand-alone or as part of a larger application, such as a multi-threaded application, according to some embodiments.

Compiler 120 may receive (e.g., read, load, etc.) source code 100 that may include one or more critical sections, such as critical section 110. Critical section 110 may represent an execution path of the source code that interacts (e.g., reads and/or writes) with one or more portions of shared memory in a multi-threaded application, according to some embodiments. When compiling source code 100, compiler 120 may be configured to generate two execution paths, one instrumented version and one un-instrumented version, for each critical section. For instance, compiler 120 may be configured to generate instrumented version 160 and un-instrumented version 170 of critical section 110 when generating critical section 150.

Compiler 120 may be configured to instrument the source code in a critical section in any of various manners, and the amount of instrumentation utilized may vary from embodiment to embodiment. For example, in one embodiment, every shared data read and/or write performed may be instrumented in a given critical section. In other embodiments, only writes may be instrumented, while in yet other embodiments both reads and writes may be instrumented. Additionally, the particular implementation of instrumentation barriers (e.g., read and/or write barriers) may vary from embodiment to embodiment.

In various embodiments, speculating threads may execute on the fast (e.g., un-instrumented) path, the slow (e.g., instrumented) path, or on both paths, while a pessimistic thread may always execute on the slow (e.g., instrumented) path. When a thread attempts to execute a critical section, it may first probe the lock, and if the lock is available (e.g., if no other thread holds the lock), the thread may execute on the fast path (e.g., using HTM after possibly probing the lock again). If this attempt fails, the thread may retry speculatively or it may change over to the slow path by acquiring (or attempting to acquire) the lock. However, when a thread probes the lock (e.g., before starting a hardware transaction) and the lock is unavailable (e.g., another thread holds the lock), the thread may execute using HTM (e.g., on the slow path) concurrently with the thread holding the lock rather than waiting for the lock (as it might do under traditional TLE). In some embodiments, the instrumentation of the slow path may be responsible for ensuring that speculating threads may execute safely (e.g., in terms of data conflicts) concurrently with the pessimistic thread.

Figure 3:
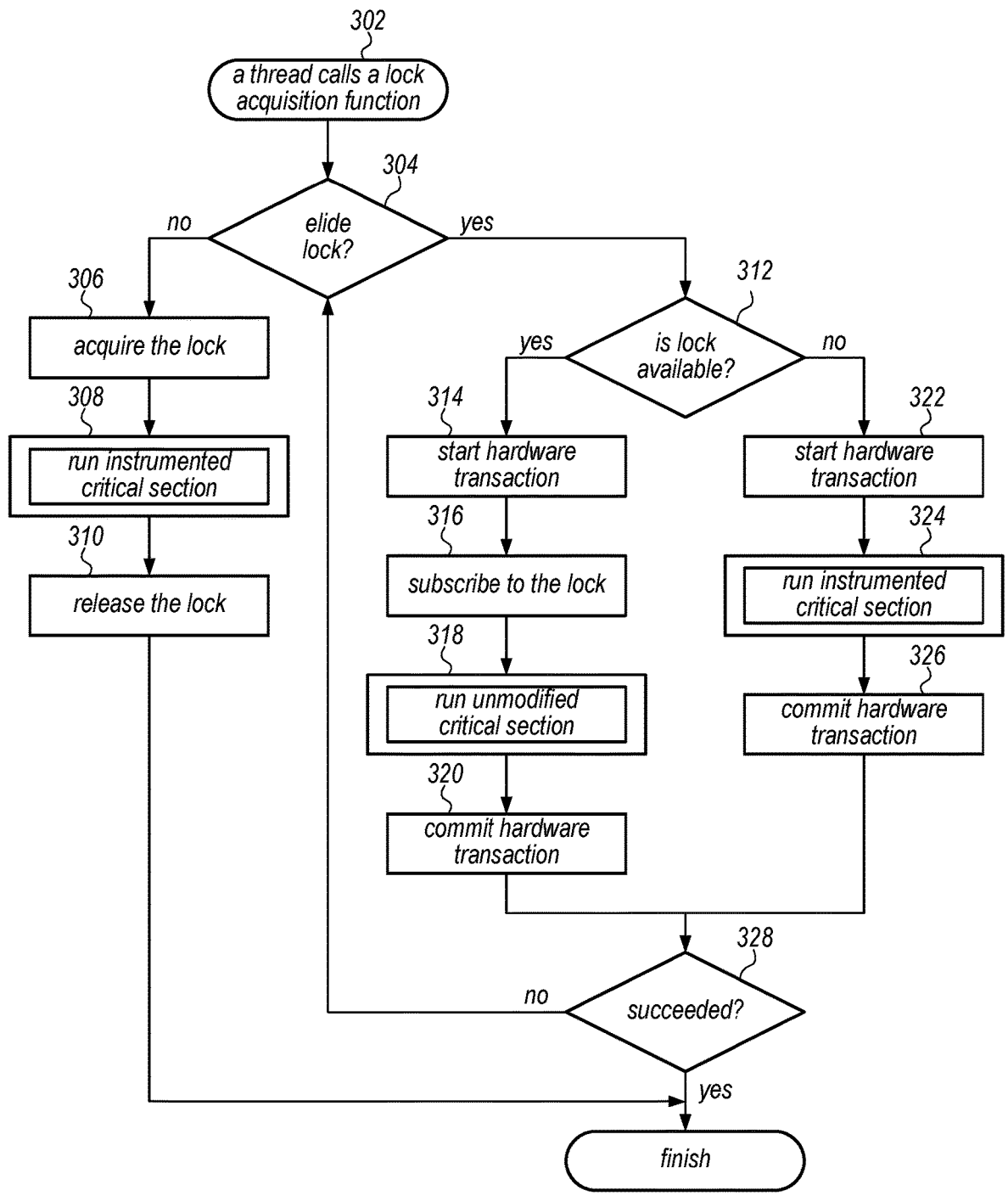
FIG. 3 is a flow diagram illustrating one embodiment of a method for concurrent transactional lock elision (TLE).

FIG. 3 is a flowchart illustrating one embodiment of a method for concurrent TLE, as described herein. As noted previously, concurrent TLE may, in some embodiments, be implemented by (or at the level of) a library providing lock implementations. When a thread calls a lock acquisition function, the concurrent TLE implementation may decide whether the lock should be elided and if so, may start a hardware transaction after making sure the lock is free. When a thread releases the lock, the concurrent TLE implementation may check whether the thread is utilizing HTM and if so, may commit the transaction. Alternatively, if the thread was not utilizing HTM, the concurrent TLE implementation may simply release the lock. If the hardware transaction fails for any reason, the HTM implementation may roll back any changes (e.g., to shared memory) that might have been made by the thread as part of the failed transaction and return execution to the point where the concurrent TLE implementation determines whether to elide the lock (and start another hardware transaction) or to abandon speculation altogether and acquire the lock.

Thus, as shown in block 302, a thread may call a lock acquisition function prior to executing a critical section. In response to the thread calling the lock acquisition function, the concurrent TLE implementation may determine whether the lock should be elided, as shown by decision block 304. The decision whether or not to elide the lock, as well as how many attempts using a hardware transaction should be made, may be based on any of various factors (e.g., workload, platform and other available speculation methods) and may vary from embodiment to embodiment.

If the lock is to be elided, as indicated by the positive output from decision block 304, the concurrent TLE implementation may first determine that the lock is available (e.g., that no thread currently holds the lock), as in decision block 312.

If the lock is available, as indicated by the positive output of decision block 312, the concurrent TLE implementation may start a hardware transaction, as shown in block 314. In some embodiments, the concurrent TLE implementation (and/or the executing thread) may subscribe to the lock, as shown in block 316, such as to ensure that the hardware transaction may be aborted in response to acquisition of the lock by another thread. The unmodified critical section may then be executed, as shown in block 318. After completing the unmodified critical section, the concurrent TLE implementation may commit (or attempt to commit) the hardware transaction, as in block 320.

If the hardware transaction fails for any reason, as illustrated by the negative output of decision block 328, the HTM implementation may roll back any changes (e.g., to shared memory) that might have been made by the thread as part of the failed transaction and return execution to the point where the concurrent TLE implementation determines whether to elide the lock at decision block 304. The TLE implementation may then determine whether to elide the lock again and therefore start another hardware transaction, as shown by the positive output of decision block 304, or to abandon speculation altogether and acquire the lock, as shown by the negative output of decision block 304.

Alternatively, rather than simply wait for the lock to become available if the lock is to be elided but is not available, the concurrent TLE implementation may be configured to start a hardware transaction, as shown in block 322 and execute the instrumented critical section, as in block 324. After the instrumented critical section is executed, the thread (and/or the concurrent TLE implementation) may commit (or attempt to commit) the hardware transaction, as shown in block 326.

If the lock is to not to be elided (e.g., either initially or after a failed hardware transaction), as illustrated by the negative output of decision block 304, the thread may acquire the lock, as in block 306, execute an unmodified critical section, as in block 308, and release the lock as shown in block 310. As noted above, when a thread not utilizing a hardware transaction releases the lock, the concurrent TLE implementation may simply release the lock, as shown in block 310.

Described herein, according to various embodiments, are two different techniques for implementing the barriers (i.e., the functions invoked for every read or write) on the instrumented (e.g., slow) path of concurrent TLE. According to embodiments of one technique (referred to herein as RW-TLE) writes (but not reads) to shared memory may be instrumented. According to some embodiments, RW-TLE may allow only hardware transactions that do not execute any writes to complete on the instrumented (e.g., slow) path. According to embodiments of another technique (referred to herein as FG-TLE) both reads and writes may be instrumented, and any transaction may complete on the instrumented (e.g., slow) path as long as it does not conflict with the lock-based execution. In both cases, the lock-based execution may use an instrumented (e.g., slow) path as well, such as to allow detection of conflicts with threads speculating on the slow path.

While concurrent TLE may be implemented in any of various manners on various systems, one embodiment described herein utilizes the manner in which compilers, such as the GCC compiler, support compilation of transactional code. For example, the GCC compiler implements transactional code support via a built-in runtime library, such as the "libitm" library as one example. While the GCC compiler allows the production of both unmodified and modified (e.g., instrumented) paths, the libitm library may allow the specification of custom functions that may be executed in response to certain events in the execution of a transaction, such as the beginning of a transaction, ending a transaction, executing a read, and/or executing a write, according to various embodiments. In some embodiments, concurrent TLE may be implemented within a runtime library, such as within the libitm library of GCC (as merely one example).

According to some embodiments, concurrent TLE may be utilized on workloads in which some of the executions on HTM fail to lock (which may correspond to the workloads of interest in realistic applications). The actual characteristics of such workloads may depend on the cost of the instrumentation and the number of threads that can execute concurrently with a thread running under the lock without having data conflicts among themselves and with the thread holding the lock.

According to some embodiments, TLE may achieve linear scalability when most transactions succeed in their lock elision attempts. However, when some operations fail to complete on HTM, the scalability may be hampered. For instance, when a thread acquires a lock, TLE may require that all speculating threads stop and wait until the lock is released. In some embodiments, the number of failures to the lock may be reduced by reducing contention between speculating threads. The use of an auxiliary lock to synchronize between transactions that fail due to data conflicts may reduce contention and thereby failures to the lock, according to some embodiments. However, the use of an auxiliary lock may not reduce the number of failures to the lock when transactions fail for other reasons, such as capacity limits or an attempt to execute an unsupported instruction.

RW-TLE

As noted above, RW-TLE, as described herein, may utilize instrumentation of writes, while allowing hardware transactions that execute on the instrumented (e.g., slow) path to only complete critical sections that do not execute writes. A compiler may be configured to instrument the writes within a critical section when compiling source code (and may also compile an un-instrumented version of the critical section). Write operations of the instrumented version of the critical section may be instrumented to detect data conflicts when accessing a portion of shared memory. Thus, RW-TLE may utilize instrumentation allowing read-read parallelism (e.g., concurrent execution of threads that only perform reads) while the lock is held. For instance, RW-TLE may allow hardware transactions that do not execute any writes to execute and commit on the instrumented (e.g., slow) path as long as the thread holding the lock has not yet executed its first write operation. Note that some realistic workloads may include critical sections that do not have any writes, or that may not execute any of their write operations in practice (e.g., a look up operation in a hash table or an insert operation in a set, which does not modify the data structure when the given key is already present in the set).

Figure 4:
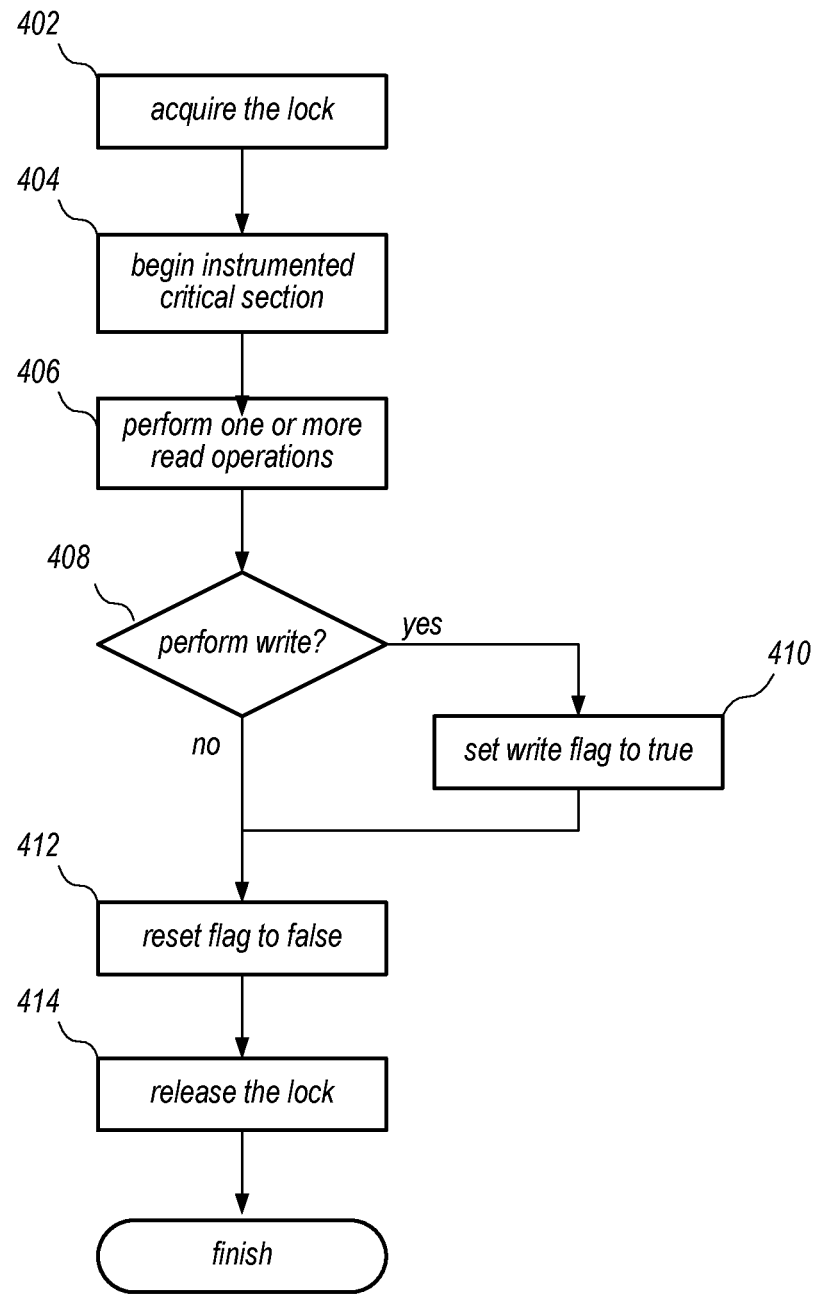
FIG. 4 is a flowchart illustrating one embodiment of a method for implementing RW-TLE using a write flag.

In some embodiments, RW-TLE may guarantee that hardware transactions abort when (and if) the thread holding the lock executes a write, or if the critical section executed by the hardware transaction needs to execute a write. For instance, in one embodiment, a lock may be augmented with a Boolean write flag (e.g., a flag indicating whether a write has occurred). FIG. 4 is a flowchart illustrating one embodiment of a method for implementing RW-TLE using a write flag.

A lock may be augmented to include a Boolean write flag and the write flag may be initialized to false. During execution, a thread may acquire a lock, as in block 402, and may then begin to execute an instrumented critical section, as in block 404. For instance, a compiler may have instrumented all the writes in the critical section so as to ensure that the write flag is set (to true) whenever a write is performed within the critical section, according to one embodiment. The thread may then perform one or more operations, as shown in block 406. As described above, the thread may perform any number (or no) read operations without triggering the setting of the write flag. Additionally, other threads may also execute concurrently while performing reads to the same shared memory without causing a conflict as long as they do not perform any writes while the first thread holds the lock, according to some embodiments.

If the thread holding the lock performs a write operation, as indicated by the positive output of decision block 408, the write flag may be set to true, as in block 410. For instance, according to some embodiments, when a thread holding the lock performs a write, the instrumented (write) barrier may set the flag (e.g., set the flag to true).

In some embodiments, the thread may only need to set the write flag to true once when the first write is performed and may not need to set the flag to true with every write the thread performs. Thus, in some embodiments, a compiler may be configured to determine a first write instruction that may be (always) be performed before other writes and ensure (e.g., when generating the code for the critical section) that the write flag is set when the first write is performed. Alternatively, in other embodiments, a compiler may be configured to determine whether one or more write operations of a critical section are always performed after one or more other write operations of the critical section and may not generate code to set the write flag for those write operation that are determined to always be performed after another write operation (since the flag would be set for the earlier write operation).

The flag may be reset again (e.g., to false) when the thread releases the lock, as shown in blocks 412 and 414.

As part of RW-TLE, as described herein, a thread executing on the instrumented (e.g., slow) path using HTM may be configured to monitor the state of a write flag and may abort any transaction in process if the flag is set to true. In other words, if a thread utilizing a lock performs a write, and thereby causes the write flag to be set to true, any threads executing concurrently (accessing the same shared memory) may abort. While the first thread is executing its critical section while holding the lock, a thread starting on the instrumented (e.g., slow) path using HTM may abort if the write flag is set to true. Thus, the thread executing its critical section using HTM may detect, according to the instrumentation of the critical section (e.g., one or more instrumented write operations) that the thread holding the lock performed one or more write operations, and in response may abort the transaction. Conversely, if the instrumented critical section determines that the thread holding the lock does not perform any write operations, the thread may commit the hardware transaction.

Figure 5:
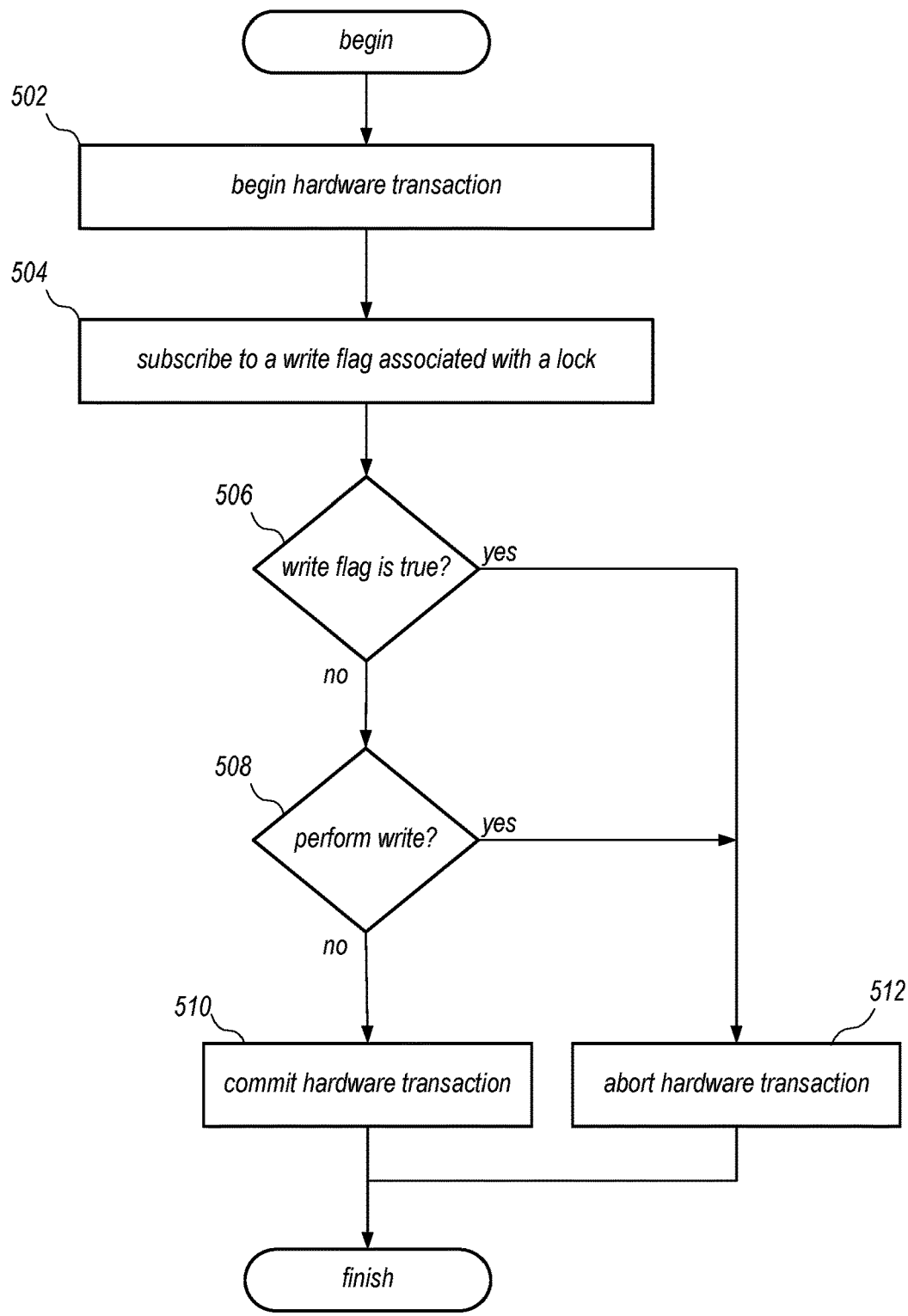
FIG. 5 is a flowchart illustrating one embodiment of a method for implementing RW-TLE using HTM with using a write flag.

FIG. 5 is a flowchart illustrating one embodiment of a method for implementing RW-TLE using HTM with using a write flag. As shown in block 502, a thread executing on the instrumented (e.g., slow) path may begin a hardware transaction and may subscribe to a write flag associated with a lock, as in block 504. Please note while FIG. 5 illustrates a thread first beginning a hardware transaction and then subscribing to the write flag, in some embodiments, the thread may perform these actions in a different order. For example, in one embodiment, subscribing to the write flag may be performed as part of beginning the transaction. For instance, the underlying TLE or HTM implementation may be configured to automatically subscribe to the write flag as part of beginning the transaction.

While the hardware transaction is active, another thread that currently holds the lock may perform a write to shared memory associated with the lock. As a result, the write flag may be set to true (e.g., due to a write barrier). The thread executing the hardware transaction may be configured to monitor the state of the write flag, such as by subscribing to the write flag associated with the lock, according to some embodiments. Thus, while the first thread is executing its critical section while holding the lock, a thread starting on the instrumented (e.g., slow) path using HTM may determine that the write flag is true, as indicated by the positive output of decision block 506. In response to determining that the write flag is true, the hardware transaction may be aborted, as in block 512. If the write flag does not get set to true (e.g., if the thread holding the lock does not perform any writes), the hardware transaction may be committed successfully if the thread did not perform any write operations, as shown by the negative output of decision block 508 and block 510. Alternatively, if the thread does perform one or more writes, the hardware transaction may be aborted, as shown by the positive output of decision block 508, as shown in block 408. Thus, in some embodiments, the transactions may be committed only if neither thread (e.g., the one using HTM and the one holding the lock) performs any write operations.

The exact manner in which the value of the write flag is determined may vary from embodiment to embodiment. In general, any suitable method for monitoring and reacting to a change in the value of the write flag may be utilized with RW-TLE. For example, pseudo-code below illustrates one embodiment of write barrier implementation in RW-TLE.

```
1    write_barrier(addr, val) {
2        if (on_htm( )) htm_abort( );
3        write = true;
4        *addr = val;
5    }
```

Note that the logic illustrated in the above example may be implemented very efficiently without any if-statements (and consequently, branch instructions) by using bitwise operations, according to one embodiment. Also, in some embodiments, RW-TLE may rely on aspects of the underlying memory model when implementing write barriers. For instance, under some memory modules, such as the Total Store Ordering (TSO) memory model, no memory fence may be required after setting the write flag, because it may be guaranteed that no other write in the critical section will be visible to the hardware transaction before the store to the write flag will.

In some embodiments, it may be enough to set the write flag (e.g., line 3 in the above example) only once for each critical section. Thus, a compiler may be able to eliminate some of the write barriers by instrumenting only the first write in a series of writes (e.g., if those writes are guaranteed to always execute one after another).

In some embodiments, only allowing read-read parallelism while a thread is holding a lock, as described herein regarding RW-TLE, may be sufficient to significantly outperform a traditional TLE implementation, as will be discussed in more detail subsequently. Thus RW-TLE may be considered beneficial for a wide variety of workloads, such as due to the prefetching effect. According to the prefetching effect, even if a thread cannot complete the execution of the critical section using a hardware transaction on the instrumented (e.g., slow) path, such as because the execution requires a write, the partial execution attempt is often sufficient to "warm up" the cache for the next execution attempt on the un-instrumented (e.g., fast) path, possibly making it faster and more likely to succeed. In other words, even though one attempt at executing the critical section fails, some (or all) of the data required for that critical section may be loaded into a cache (e.g., pre-fetched) and thus may be in the cache when the critical section is subsequently attempted, thereby possibly decreasing the latency required to complete the critical section, according to some embodiments.

FG-TLE

As noted above, RW-TLE may, in some embodiments, allow hardware transactions that run on the instrumented (e.g., slow) path to complete only critical sections that do not execute writes. However, a library implementing concurrent TLE as described herein, may be configured to allow hardware transactions that run on the instrumented (e.g. slow) path to complete critical sections that execute writes as well as reads, according to some embodiments. For example, by instrumenting both reads and writes performed in a critical section, fewer restrictions may be placed on a hardware transaction that can execute and commit while a thread is holding the lock, such as to allow critical sections that perform writes to commit successfully. The methods, techniques and/or mechanisms utilized to allow a hardware transaction to execute and complete critical sections that perform writes while a thread is holding the lock may be referred to herein as FG-TLE.

In some embodiments, a system implementing FG-TLE as described herein may be configured to maintain an array of ownership records (orecs) that captures (or maintains, holds, indicates, etc.) information on the addresses that are accessed by an atomic block when executed in the software path. These orecs may then be used to detect conflicts between concurrent executions of the hardware transactions and the thread executing in the software fallback path. For instance, in some embodiments, a shared array of records, each including one or more indicators (e.g., bits, bytes, fields, etc.) representing whether or not respective portions of shared memory have been (or are being) accessed (e.g., either for reading or writing) may be used as ownership records.

In some embodiments implementing FG-TLE, it may not be necessary to detect conflicts between software executions of the critical section (unlike with standard STM implementations), as there may only be one such execution at a time (e.g., by the thread that is holding the lock). Thus, in some embodiments, only the one thread holding the lock may update the orecs. Additionally, the updated orecs may only be read within hardware transactions (e.g., by code using a hardware transaction), according to some embodiments.

The use of orecs as described herein may, in some embodiments, significantly simplify the solution and provide greater flexibility in the design choices. For example, it may be safe for a thread holding the lock to refine the conflict detection granularity by resizing the orecs array, as long as all hardware transactions that run on the slow path read and/or monitor the changed array size. Furthermore, the execution of the critical section in the software path (e.g., by the thread holding the lock) may be guaranteed to succeed (unlike with standard STM implementations), which may reduce the overhead for that execution and shorten the time in which other threads may not use the fast path (i.e., because the lock is unavailable).

Within a system implementing FG-TLE as described herein, threads may execute on the un-instrumented (e.g., fast) path while checking that no other thread is holding the lock. Additionally, a thread that decides to abandon the fast path may acquire the lock and execute the critical section while recording information regarding its read and write operations, such as to an orecs array. For instance, in one embodiment, prior to every read or write operation, the thread may use some mapping hash function to find the associated orec and mark it as being owned for read or for write. The thread may release ownership of all orecs once it is done executing the critical section and release the lock, according to some embodiments.

The list below represents a high level description of one example implementation of FG-TLE, as described herein:

Threads may execute on the fast path (as with standard TLE implementations) while checking that no thread is holding the lock.

A thread may abandon the fast path, acquire the lock, and execute the critical section while recording information regarding its read and write operations (e.g., in an orecs array). The thread may release ownership of all orecs once it is completed execution of the critical section, and then may release the lock.

While the lock is held by one thread, other threads may still run using hardware transactions in the slow path, checking associated orecs prior to every read and write operation. A hardware transaction may be aborted in response to a potential conflict (i.e. if the associated orec is held for writing, or if it is held for reading and the hardware transaction needs to execute a write).

Figure 6:
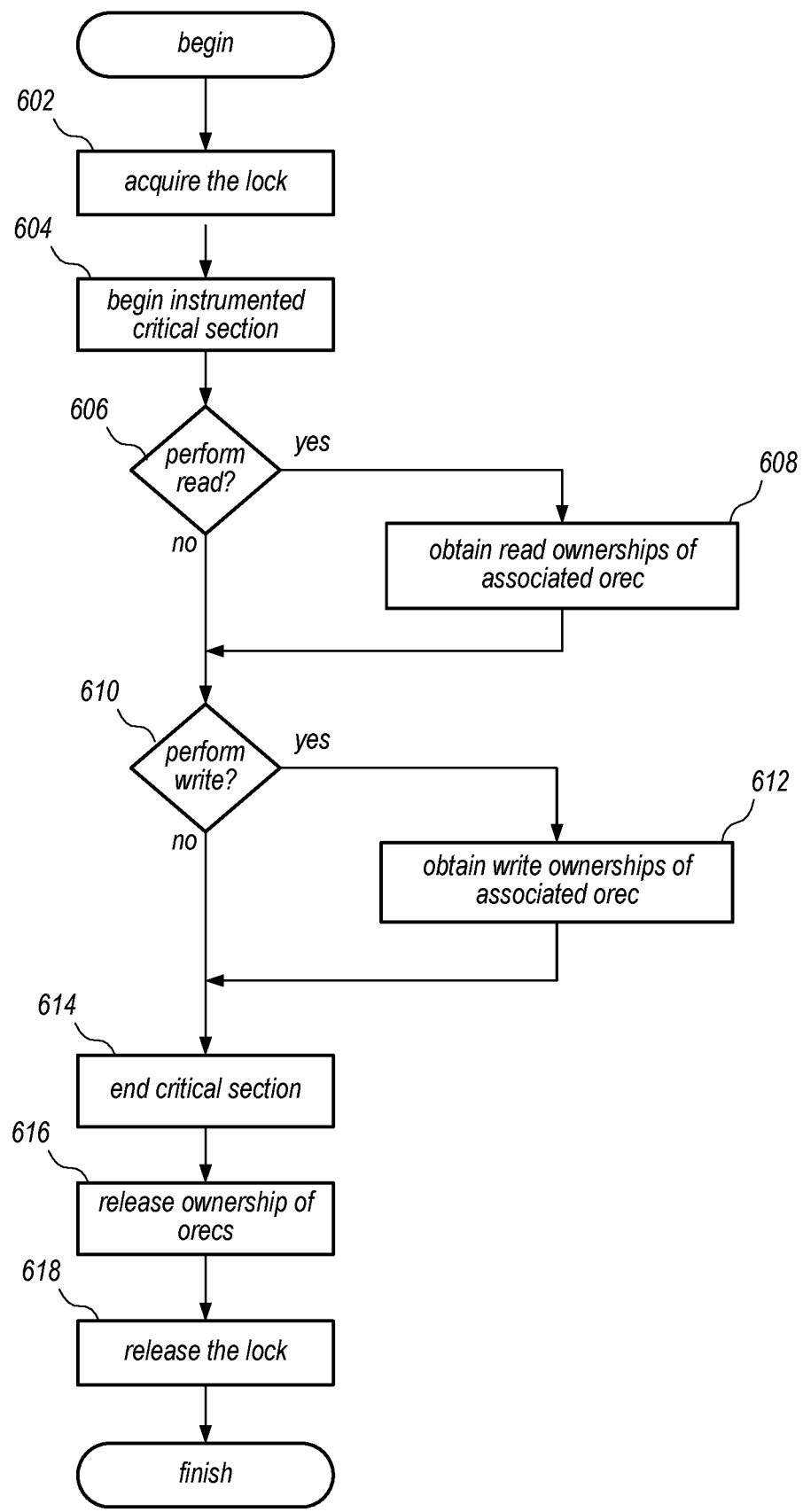
FIG. 6 is a flowchart illustrating one embodiment of a method for implementing FG-TLE as described herein.

FIG. 6 is a flowchart illustrating one embodiment of a method for implementing FG-TLE, as described herein. As shown in block 602, a thread may acquire a lock and may then begin executing an instrumented critical section, as in block 604. As noted above, when utilizing FG-TLE, a critical section may be instrumented in order to allow the use of an orecs array to indicate portions of shared memory that have been read and/or written, so as to prevent potential conflicts between threads. During the execution of the instrumented critical section, the thread may perform read and or write operations on shared memory associated with the lock and for which associated orec records are maintained, according to some embodiments.

Thus, if one or more read operations are performed during the critical section, as indicated by the positive output of decision block 506, the thread may obtain read ownership of one or more corresponding associated orecs, as shown in block 608. For instance, in one embodiment, an array of ownership records may be maintained and mapped to various locations of shared memory. When an instrumented critical section reads a portion of the shared memory, an associated field (e.g., one or more bits) of an orec may be updated to indicate that the associated portion of shared memory was read by a thread holding the lock (used for concurrent access to that area of shared memory), according to one embodiment. For instance, prior to every read or write operation, the thread may use some mapping hash function to locate the associated orec, and may then mark the orec as being owned for reading or for writing. In exact manner in which orec arrays are maintained and accessed (e.g., to obtain, release and determine ownership information) may vary from embodiment to embodiment and in general, any suitable method for maintaining one or more indications regarding whether portions of shared memory have been (or are being) accessed via a read and/or write operation may be utilized with FG-TLE, according to various embodiments.

Similarly, if the critical section performs one or more write operations, as indicated by the positive output of decision block 610, the thread may obtain write ownership of one or more associated orecs, as in block 612. As with obtaining read ownership, any of various methods for maintaining and accessing ownership records may be utilized and the exact manner in which ownership records are maintained and accessed may vary from embodiment to embodiment.

After execution of the critical section has ended, as shown in block 614, the ownership of the orecs may be released, as in block 616. For example, after the critical section has finished executing, the thread may release (e.g., reset) any orecs for which ownership (whether for reading or writing) was obtained during execution of the critical section, in some embodiments. As with obtaining ownership of orecs, the exact manner and/or method for release ownership of orecs may vary from embodiment to embodiment. After releasing ownership of the orecs, the lock may be released, as shown in block 618.

As noted above, in some embodiments, only the thread holding the lock may update the orecs. Thus, the orecs array may be associated with the lock such that no thread may write to the orecs (e.g., to indicate that a portion of shared memory has been read and/or written) unless it has acquired the lock. Additionally, since other threads may need to access the orecs to determine whether a thread holding the lock has read and/or written to shared memory, the orec array may be configured for concurrent access (e.g., by one writer, but many readers), according to some embodiments.

While a lock is being held by one thread, other threads may still execute using hardware transactions on the instrumented (e.g., slow) path. Threads executing using hardware transaction on the slow path may be configured to check the associated orec prior to each (and/or every) read or write operation. A thread on the slow path may abort the transaction due to a potential conflict with the thread holding the lock. For instance, if the associated orec is held for writing by another thread (e.g., the thread holding the lock), the thread on the slow path may abort regardless of whether the critical section of the hardware transaction performs read operations or write operations. Additionally, if the critical section of the hardware transaction performs only read operations, the thread on the slow path may not abort if the associated orec is only held for reading by another thread. However, if the critical section of the hardware transaction performs any write operations, the thread on the slow path may abort if the associated orec is held for reading or writing by another thread.

Figure 7:
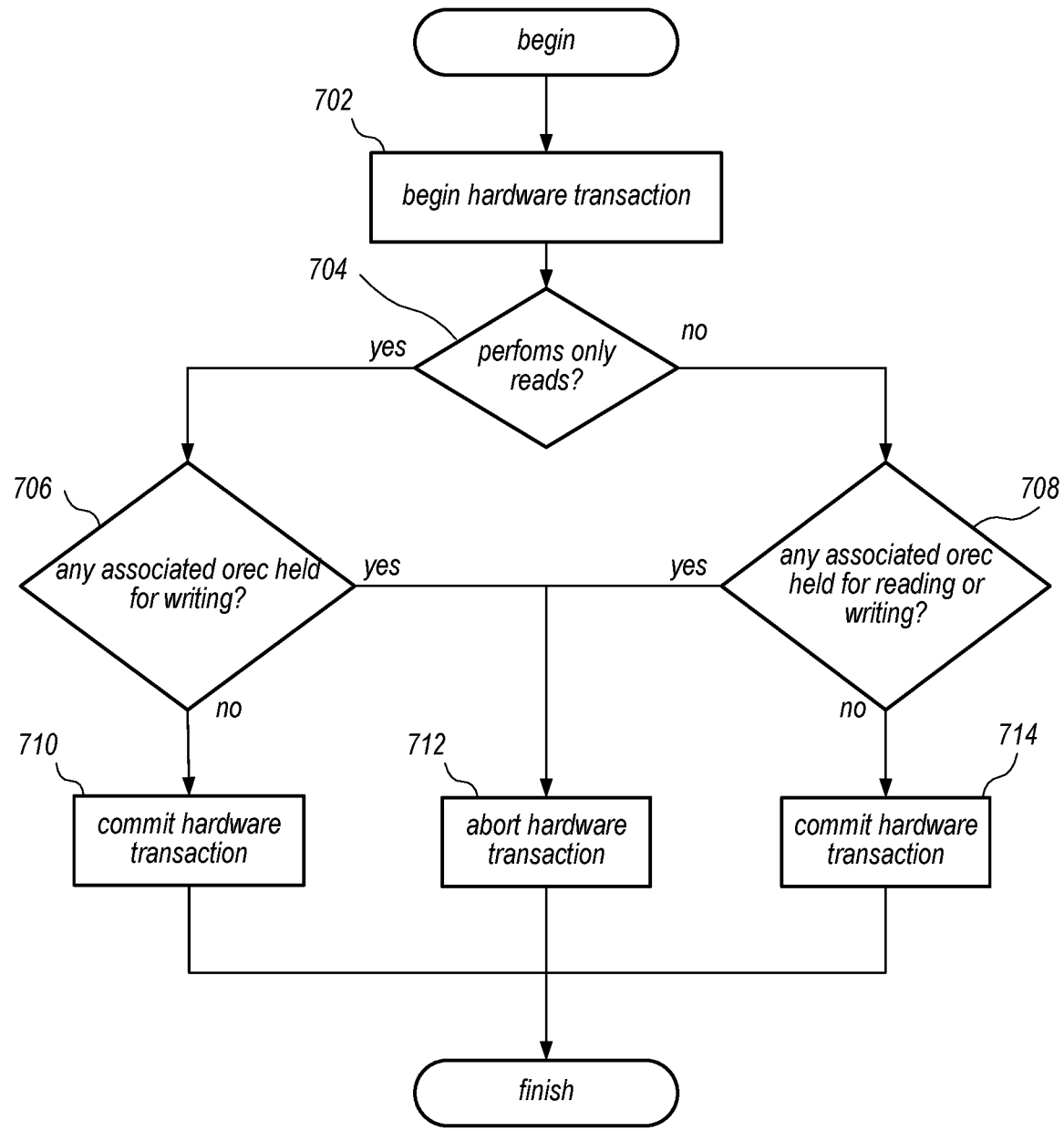
FIG. 7 is a flowchart illustrating one embodiment of a method for implementing FG-TLE as part of using a hardware transaction concurrently with a locking mechanism, as described herein.

FIG. 7 is a flowchart illustrating one embodiment of a method for implementing FG-TLE as part of using a hardware transaction concurrently with a locking mechanism, as described herein. As shown in block 702, a thread may begin a hardware transaction. For instance, a thread may have attempted to execute an unmodified critical section via a hardware transaction, but the transaction may have aborted, in response the thread may have tried to execute an instrumented version of the critical section while using a hardware transaction (e.g., on the slow path). If the critical section performs only read operations on shared memory, as indicated by the positive output of decision block 704, the thread (and/or the underlying HTM or TLE implementation) may determine, for each read, whether or not an orec associated with the shared memory has been written to by a thread holding a lock corresponding to the shared memory. For example, as described above, the thread executing on the slow path may access an array of ownership records to determine whether the particular portion of shared memory has been written to by a thread holding the lock. If, as shown by the negative output of decision block 706, none of the orecs associated with any of the read operations performed using (e.g., within) the hardware transaction are held (e.g., owned) for writing, the hardware transaction may be committed, as in block 710, according to some embodiments. If, however, an orec associated with one or more of the read operations performed using (e.g., within) the hardware transactions is held for writing, as indicated by the positive output of decision block 706, the hardware transaction may be aborted, as shown in block 712.

If, as indicated by the negative output of decision block 704, the critical section using the hardware transaction performs one or more write operations, the thread may determine whether any orec associated with any of the write operations performed by the critical section are held for either reading or writing by a thread holding the lock associated with the shared memory. If, as indicated by the negative output of decision block 708, any orec associated with a write operation performed using the hardware transaction is held for reading or writing, the hardware transaction may be aborted, as shown in block 712. Alternatively, if no associated orec associated with a write operation performed using the hardware transaction is held for reading or writing, as indicated by the negative output of decision block 708, the hardware transaction may be committed, as in block 714.

Thus, when the thread utilizing the hardware transaction performs a read operation, it may check to see if any orec associated with the read operation (e.g., associated with a memory location targeted by the read operation) is held for writing by another thread (e.g., the thread holding the lock). Similarly, when the thread performs a write operation, it may check to see of any orec associated with the writer operation (e.g., associated with a memory location targeted by the write operation) is held for reading or writing by another thread (e.g., the thread holding the lock).

Alternatively, in some embodiments, if the critical section using the hardware transaction performs one or more write operations, the thread may determine whether any orec associated with any of the read or write operations performed by the critical section are held for either reading or writing by another thread (e.g., the thread holding the lock associated with the shared memory).

As noted above ownership records (e.g., orecs) storing information on address that are accessed by an atomic block (or other critical section) may be maintained and used to prevent conflicts between threads using hardware transactions on the slow path and a thread that acquires and holds the lock. In one embodiment, a single orec array containing indicators for both read ownership and write ownership may be used. In other embodiments however, two separate orecs arrays may be used: one to record read ownership (r_orecs), and the other to record write ownership (w_orecs). For example, in some embodiments, using a single array to indicate both read ownership and write ownership may cause all hardware transactions which read addresses that map to a particular orec to abort due to a transition of the orec between an unowned (or released) state and a read-owned state. However, with two arrays, read operations by a hardware transaction on the slow path may check only the write ownership orecs array, while write operations check both arrays, according to some embodiments.

In some embodiments, acquisition and release operations for ownership records may utilize an epoch based scheme. For example, in one embodiment an epoch counter (e.g., a global sequence number) may be maintained and incremented twice (only) by the thread holding the lock: once right after acquiring the lock, and once just before releasing it. When using an epoch counter, acquiring an orec (e.g., for read ownership or write ownership) may be performed by storing in it the current value of the epoch counter, according to some embodiments. In order to release all orecs acquired during execution of a critical section, a thread holding the lock may increment the epoch counter before releasing the lock. Thus, in some embodiments, the thread that holds the lock may implicitly release the ownership of all orecs it owns, without causing any of the hardware transactions running in the slow path to abort.

Threads that are executing on the slow path using HTM may read a snapshot of the epoch counter before starting the hardware transaction, and using the hardware transaction, any orec that has an epoch value smaller than the snapshot value is unowned (e.g., in a released state). For instance, in one embodiment, a thread executing on the slow path using HTM may verify that an orec is unowned by asserting that the epoch number stored in it is strictly smaller than a snapshot taken just prior to starting the hardware transaction.

Figure 8:
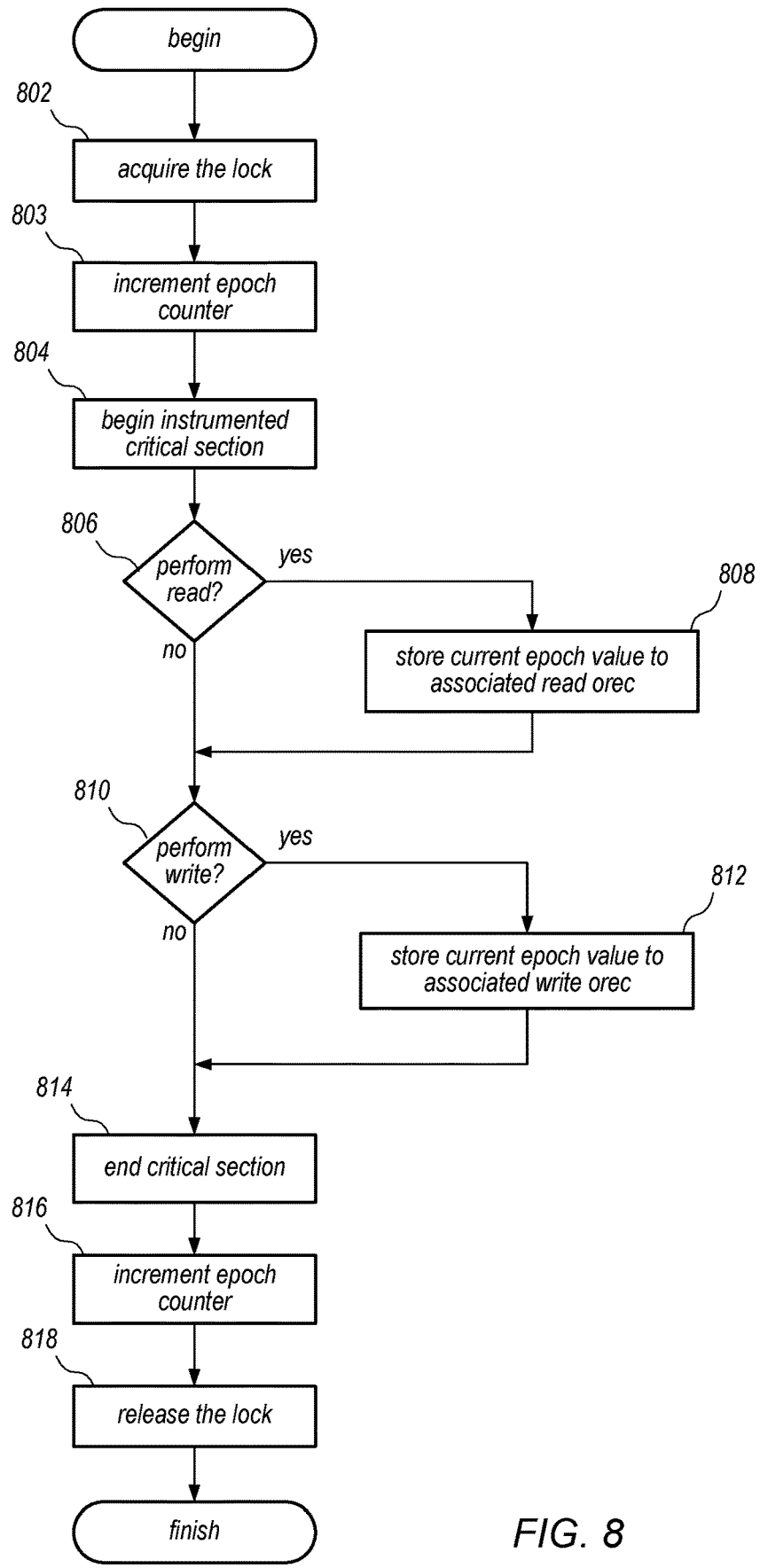
FIG. 8 is a flowchart illustrating one embodiment of a method for utilizing an epoch counter to indicate ownership information by a thread holding a lock.

FIG. 8 is a flowchart illustrating one embodiment of a method for utilizing an epoch counter to indicate ownership information by a thread holding a lock. As shown in blocks 802, 803 and 804, a thread may acquire a lock, increment an epoch counter, and may then begin executing an instrumented critical section. As noted above, when utilizing FG-TLE, a critical section may be instrumented in order to allow the use of an ownership records (e.g., a list, array, database, or other set of ownership records) to indicate portions of shared memory that have been (or are being) read and/or written, so as to prevent conflicts between threads. Thus, if one or more read operations are performed during the critical section, as indicated by the positive output of decision block 806, the thread may store the current epoch value to a read ownership record (e.g., an entry in a read orec array) associated with the address (e.g., in shared memory) being read, as shown in block 808. Similarly, if the critical section performs one or more write operations, as indicated by the positive output of decision block 810, the thread may store the current epoch value to a write ownership record (e.g., an entry in a write orec array) associated with the address (e.g., in shared memory) being written, as shown in block 812.

For example, as described above, a global epoch counter (e.g., increment-able global sequence number) may be maintained and used to indicate ownership information (e.g., in ownership records) of shared memory locations. When a thread currently holding a lock associated with a portion of shared memory performs a read or a write to an address in the shared memory, the current value of the epoch counter may be stored (e.g., written) in an ownership record associated with the address. In some embodiments, two separate arrays of ownership records may be maintained, one to indicate read ownership and one to indicate write ownership. In other embodiments, however, ownership records may be maintained and accessed in different manners and using different data structures.

After execution of the critical section has ended, as shown in block 814, the ownership of the orecs may be released, such as by incrementing the epoch counter as shown in block 816. Thus, in some embodiments, rather than having to individually release each orec for which ownership was obtained (e.g., marked), a thread may release all ownership for all orecs by incrementing the epoch counter (e.g., all ownership records may then be guaranteed to contain an epoch value smaller than the current epoch value). After releasing ownership of the orecs, the lock may be released, as shown in block 818.

Figure 9:
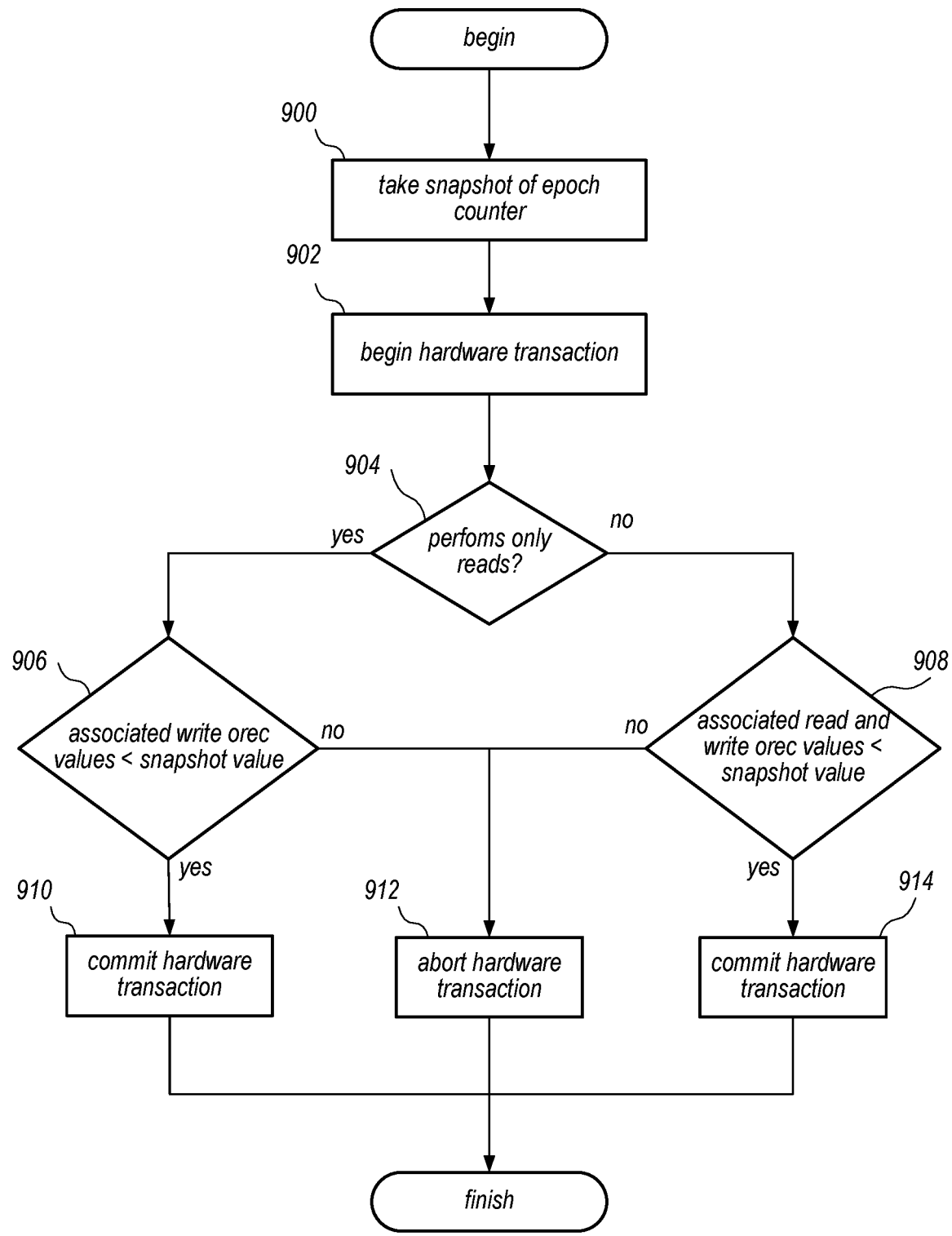
FIG. 9 is a flowchart illustrating one embodiment of a method for using an epoch counter as part of using a hardware transaction concurrently with a locking mechanism, as described herein.

FIG. 9 is a flowchart illustrating one embodiment of a method for using an epoch counter as part of using a hardware transaction concurrently with a locking mechanism, as described herein. As described above, a thread running on the instrumented (e.g., slow) path using HTM may first take a snapshot of an epoch counter, as in block 900 before beginning a hardware transaction as shown in block 902. For instance, the thread may obtain and store (e.g., locally) a copy of the current value from a global epoch counter (e.g., global sequence number), according to one embodiment. In some embodiments, the epoch counter may be accessible directly, while in other embodiments, one or more functions or objects may be used to access the epoch counter.

If the critical section performs only read operations on shared memory, as indicated by the positive output of decision block 904, the thread (and/or the underlying HTM or TLE implementation) may determine, for each read, whether an associated orec value is less than the snapshot value. As described above, if an ownership records currently holds an epoch value that is smaller than the current epoch counter (as stored in the snapshot taken by the thread), then the orec is not currently owned by a thread holding the lock, and therefore the associated shared memory location has not been written to by the thread holding the lock, according to some embodiments.

If, as shown by the positive output of decision block 906, the associated orec values for each of the read operations performed using the hardware transaction have values that are less than the snapshot value of the epoch counter, the hardware transaction may be committed, as in block 910, according to some embodiments. If, however, a value in an orec associated with one or more of the read operations performed using the hardware transactions is equal to (or greater than) than the snapshot value, as indicated by the negative output of decision block 906, the hardware transaction may be aborted, as shown in block 912.

If, as indicated by the negative output of decision block 904, the critical section using the hardware transaction performs one or more write operations, the thread may determine whether any orec associated with any of the write operations performed by the critical section are held for either reading or writing by a thread holding the lock associated with the shared memory. If, as indicated by the negative output of decision block 908, any associated read orec value or associated write is equal to (or greater than) the value of the snapshot taken before beginning the hardware transaction, the hardware transaction may be aborted, as shown in block 912. Alternatively, if all associated orec values (both read orec value and write orec value) are less than the snapshot value, as indicated by the positive output of decision block 908, the hardware transaction may be committed, as in block 914.

The following pseudo-code illustrates one possible embodiment of read and write barriers used as part of an example FG-TLE implementation according to one embodiment.

```
1    read_barrier(addr) {
2        if (on_htm( )) {
3            uint64_t index = fast_hash(addr, N);
4            if (w_orecs[index] >= local_seq_number)
                 htm_abort( );
5        } else if (uniq_r_orecs < N) {
6            uint64_t index = fast_hash(addr, N);
7            if (r_orecs[index] < global_seq_number) {
8                r_orecs[index] = global_seq_number;
9                mem_fence( );
10               uniq_r_orecs++;
11           }
12       }
13       return *addr;
14   }
16   write_barrier(addr, val) {
17       if (on_htm( )) {
18           uint64_t index = fast_hash(addr, N);
19           if (r_orecs[index] >= local_seq_number ||
                 w_orecs[index] >= local_seq_number) htm_abort( );
20       } else if (uniq_w_orecs < N) {
21           uint64_t index = fast_hash(addr, N);
```

```
22          if (w_orecs[index] < global_seq_number) {
23              w_orecs[index] = global_seq_number;
24              mem_fence( );
25              uniq_w_orecs++;
26          }
27      }
28      *addr = val;
29  }
```

In the above example pseudocode, the local_seq_number variable may represent a snapshot of an epoch counter or other sequence number used to indicate the status of ownership records associated with portions of shared memory. In some embodiments, each thread executing a hardware transaction on the slow path may take a snapshot of the epoch counter. The fast_hash( ) function referenced in the above example pseudocode may represent any suitable hash function usable to associate an address with an entry in an array. For example, in one embodiment, such a hash function may take a 64 bit integer i and a number r, apply a few bitwise operations to return a value in the [0, r−1] range. However, please note that any of various suitable methods for associating particular ownership records with portions of shared memory may be utilized with FG-TLE and that the exact manner in which ownership records are associated with shared memory, located, and accessed may vary from embodiment to embodiment.

In some embodiments storing the epoch (e.g., the current value of an epoch counter) in an orec may be avoided if it has already been done in the current execution (e.g., within the current critical section). For example, in one embodiment, the current epoch value may only be stored in an orec if the current epoch value is greater than the value already stored in the orec. Avoiding unnecessarily storing a current epoch value to an orec may avoid any unnecessary write operations and may also avoid any memory fence that follows a write (e.g., to store the current epoch value to an orec), according to some embodiments.

Second, avoiding unnecessarily writing the current epoch value to an orec may avoid an unnecessary abort of a hardware transaction. For instance, in some embodiments, a hardware transaction may be unnecessarily aborted when the current epoch value is written to the orec when that orec already contains the current epoch value after the thread executing the hardware transaction determines that the orec has been acquired for read ownership and proceeds (e.g., because it only needs read access to the addresses mapped to that particular orec). The second time the epoch value is stored to the orec may trigger an abort of the hardware transaction. Thus, in some embodiments, the thread holding the lock may avoid storing the current epoch value to an orec that already holds that value.

In some embodiments, a system implementing FG-TLE as described herein, may be configured to keep thread local counters indicating how may orecs are acquired for reading and writing, respectively, according to some embodiments. By maintaining local orec counters, a thread (that holds the lock) may, in some embodiments, determine that all orecs associated with the relevant portion of shared memory have been acquired and may therefore stop updating ownership records (e.g., since all of them have already been acquired) during the current critical section. In one embodiment, once the local orec count reaches the total number of orecs, both read and write barriers for the thread holding the lock become (or become the equivalent of) no-ops. Thus, a thread may avoid unnecessary writes to the ownership records as well as avoiding unnecessarily mapping an address to an ownership record, thus potentially optimizing barrier code.

Furthermore, avoiding unnecessary updates to orecs may avoid the necessity of placing one or more memory fences when implementing read and write barriers for FG-TLE. For example, in some embodiments, such as those utilizing the TSO memory model, it may be guaranteed that threads running using HTM on the slow path will always see the effect of the write that acquired an orec prior to seeing any write done by the thread holding the lock to any address associated with that orec. Thus, there may be no risk of a hardware transaction seeing the result of a partial execution of an atomic block that is executed under the lock.

However, in some implementations without memory fences there may be a risk that a hardware transaction may commit before noticing that an orec associated with a location written to by the hardware transaction was already acquired by a thread holding the lock. Thus, there may be a risk, in some implementations without memory fences, that a hardware transaction may conflict with the thread holding the lock and therefore interfere with the execution of that thread. To avoid such a conflict between a hardware transaction and the thread holding the lock, in some embodiments, a memory fence instruction may be executed by the thread holding the lock just before a hardware transaction is about to commit. However, executing a memory fence instruction just before committing a hardware transaction may not be supported by the hardware utilized by some implementations in some embodiments. Thus, in some embodiments, a memory fence may be placed after (at least) every read acquisition of an orec.

Adaptive FG-TLE

In some embodiments, an adaptive version of FG-TLE, which may be referred to herein as adaptive FG-TLE, may be implemented that dynamically adjusts the number of orecs used (e.g., for a particular workload, etc.). As noted above, in some embodiments, the number of orecs may be changed while a thread is holding the lock. Other threads, such as threads running on the slow path with HTM may be configured to verify (e.g., read) the current number of orecs being used before (or during) execution of a hardware transaction. Additionally, the epoch numbers stored in the orecs may, in some embodiments, be a good indicator for whether the number of orecs should be increased or decreased. For example, if many orecs are never used, the number of orecs may be reduced. Thus, in some embodiments if the number of orecs that are used falls below a predetermined threshold, the number orecs may be adjusted (e.g., reduced). Conversely, if some (most, or even all) orecs are frequently used, the number of orecs may be increased. Thus, in some embodiments, if the number of used orecs grows beyond a predetermined threshold, the number of orecs may be adjusted (e.g., increased).

Thus, in some embodiments, the FG-TLE implementation may be configured to occasionally (or in some embodiments continually) monitor how often orecs are being used and to adjust the number of orecs accordingly. In other embodiments, the thread holding a lock may be configured to adjust the number of orecs being used. For instance, as described above, in some embodiments, threads may be configured to keep thread local counters indicating how many orecs are acquired for reading and writing and the thread local counters may be used to adjust the number of orecs being used.

By dynamically adjusting the number of orecs being used the instrumentation overhead for FG-TLE may be reduced, according to some embodiments. For example, it may become more likely that the number of orecs acquired by a thread executing under a lock equals the total number of orecs and therefore the thread may avoid unnecessarily repeatedly updating the ownership records, as discussed above.

Note that as used herein the term FG-TLE also includes the methods, techniques and/or mechanisms described above regarding adaptive FG-TLE.

Additionally, in some embodiments, a system implementing concurrent TLE may be configured to dynamically switch between various implementations of TLE (e.g., between standard TLE, concurrent TLE, RW-TLE, FG-TLE and/or adaptive FG-TLE). For instance, a flag indicating a particular implementation of TLE may be utilized to indicate the particular implementation of TLE being used. For example, in one embodiment, a fgtle_active flag may be used to indicate whether one or more features described herein as FG-TLE are currently being used may be read my hardware transactions in the slow path. A thread that is holding the lock may change (e.g., unset) the flag (e.g., fgtle_active) before executing a critical section without any instrumentation, according to one embodiment. After completing the critical section (e.g., the critical section without instrumentation), the thread may reset the flag (e.g., fgtle_active) before releasing the lock. Additionally, a thread holding the lock may verify that the flag (e.g., fgtle_active) is set correctly before executing an instrumented critical section, according to some embodiments. The exact manner and/or data structures used to indicate, as well as dynamically switch among, particular implementations of TLE may vary from embodiment to embodiment.

In various embodiments, the techniques, methods and/or mechanisms described herein (e.g., concurrent TLE) may be safe (i.e., in terms of data consistency) when locks are used in a traditional way, such as to protect access to shared data, and when data is accessed only under the lock. However, in other embodiments, such as those involving unconventional lock use cases (e.g., such as when a lock is used as a barrier to synchronize multiple threads), additional functionality may be used to ensure safe execution.

For example, in some embodiments, a lazy subscription optimization may be applied on the slow path in order to ensure proper synchronization between threads. The following example pseudo-code illustrates one example implementation in which a lazy subscription optimization may be applied.

---

GoFlag is initially 0
Ptr is initially null
Thread 1:
  Lock(L);
  GoFlag=1;
  ...;
  Ptr = SomeNonNullValue;
  Unlock(L);
Thread 2:
  while GoFlag == 0; // wait for GoFlag to be set
  Lock(L); Unlock(L); // empty critical section
  Ptr->SomeField = 3; // expects pointer to be non-null

---

In the example above, Thread 2 might succeed to perform its empty critical section and access Ptr before Thread 1 initializes this pointer. In order to prevent such an occurrence, in some embodiments, a lazy subscription optimization may be applied on the slow path. The speculating thread may then subscribe to the lock right before committing its transaction (as opposed to right after starting its transaction, as it may be done in the fast path). Note that applying a lazy subscription optimization when using traditional TLE may be subject to numerous pitfalls. However, utilizing a lazy subscription optimization in RW-TLE and/or FG-TLE (including adaptive FG-TLE) may always be safe due to the instrumentation of the slow path, according to some embodiments.

Note that the above pseudo-code is presented to demonstrate a potential use of a lazy subscription optimization and that the usage pattern of the above example does not fit the transactional programming model. In particular, once the critical section of Thread 1 is replaced with an atomic block, the writes to GoFlag and to Ptr become visible to other threads atomically together, and the scenario described above cannot occur.

Performance Evaluation

According to various embodiments, the techniques, methods and/or mechanisms described herein may yield significant performance advantages over TLE in various workloads including various data structures, such as AVL trees and skip-lists (despite the lack of compiler support for in-lining of barrier functions and with a relatively small 4-core machine featuring HTM). Additionally, the cost of instrumentation may be reduced via in-lining, according to some embodiments.

Through an extensive set of experiments with microbenchmarks based on common fundamental data structures, the methods, techniques and/or mechanisms described herein have been shown, according to some embodiments, to provide potential benefits over traditional TLE in a wide range of workloads. Example implementations, according to various embodiments, were evaluated using a set of microbenchmarks based on common fundamental data structures.

Note that the experiments, as well as the results, described herein represent example manners in which to setup, configure, initialize, implement, execute and/or evaluate the methods, techniques and/or mechanisms described herein according to some example embodiments. In other embodiments, the methods, techniques and/or mechanisms described herein may be setup, configured, initialized, implemented, executed and/or evaluated in any of various different manners. In general, the exact manner in which the methods, techniques and/or mechanisms described herein may be setup, configured, initialized, implemented, executed and/or evaluated may vary from embodiment to embodiment.

The methods, techniques and/or mechanisms described herein have been implemented, in some embodiments, in the libitm library of the GCC compiler (as just one example). This library is a part of the open-source GCC distribution, and is intended to support transactional programs by providing several synchronization mechanisms, including (standard) TLE. Note that evaluations described herein used GCC 4.9.0.

The results described herein represent experiments with AVL trees and skip-lists implementing a set interface (supporting Insert, Remove and Find operations), and with skip-lists implementing a priority queue interface (supporting Insert and RemoveMin operations), according to one example embodiment.

Experiments were run on a Haswell (Core i7-4770) 4-core hyper-threaded machine (8 hardware threads in total) running at 3.40 GHz and powered by Oracle Linux 7, according to one example embodiment. To reduce the noise from the power management subsystem, the machine was set up in performance mode (i.e., the power governor was disabled, while all cores were brought to the highest frequency), with the turbo mode disabled. Furthermore, before starting measurements, all threads were set to spin for a few seconds to allow the system to warm up.

In these experiments, the number of threads varied between 1 and 8. All threads were synchronized to start at the same time (after a warm-up period), and performed work for 5 seconds unless specified otherwise. During that time, each thread performed operations chosen uniformly and at random according to the given probability (e.g., 60% Find, 20% Insert and 20% Remove). The data structure used for a particular experiment was initialized with keys selected uniformly and at random as described in corresponding sections below. The key for each operation performed by each thread (e.g., Find in set) was also chosen uniformly and at random. At the end, each thread reported the total number of operations it had performed, and the total throughput was calculated. Each experiment was run 5 times, and the average throughput is reported. Note that the variance of the reported results is negligible. Various performance statistics are presented as measured for runs that yielded a median throughput result.

The implementations of RW-TLE and FG-TLE were compared with standard (i.e., traditional) TLE and a lock-based synchronization. In some implementations of FG-TLE, binary flags were replaced with two separate and padded arrays holding epoch numbers (r_orecs and w_orecs respectively), as discussed above. In FIGS. 10 through 14, discussed below, FG TLE (X) may be used to denote a version that uses arrays of size X each. The other two synchronization techniques, standard (i.e., traditional) TLE (denoted in the figures and in the following simply as TLE) and a lock-based synchronization, were provided by libitm up to a few modifications described next.

In order to obtain useful comparisons, two material modifications were made to the standard TLE implementation of libitm, as explained below. When a hardware transaction in Haswell HTM aborts, the architecture provides a hint bit indicating whether one should retry on HTM. The original implementation of standard TLE in libitm uses a policy that decides to retry on HTM only when the hint bit is set. It was found through experimentation that relying on this bit may not be efficient, and better performance may be achieved when the retry policy does not take it into account. In many cases, the transaction failure code returned by hardware was 0, providing no meaningful information about the cause of the failure.

As a result, the standard TLE implementation of libitm may be modified to discard the hint bit. The same approach may also be followed with RW-TLE and FG-TLE as well. In addition, the number of retries on HTM before resorting to lock was increased from two to five for these experiments. It was found in the experiments that a slightly higher number of attempts had a significant positive impact on standard TLE results. The same constant number of attempts was used for RW-TLE and FG-TLE. Thus, in all TLE variants, e.g., standard TLE, RW-TLE and FG-TLE, the failed hardware transaction is retried up to five times before resorting to the lock, regardless of the hint bit. Note that for RW-TLE and FG-TLE, only attempts on the fast path are counted.
Experiments with Sets Discussed below are results of evaluation of two example implementations of the set interface—one based on AVL trees and another based on skip-lists. This evaluation used sequential versions of trees and skip-lists based on publicly available reference implementations. Note that in both versions, the memory for nodes inserted to (removed from) the set was allocated (de-allocated, respectively) inside the critical section. At the beginning of each experiment, the set was initialized with keys selected uniformly and at random from the given key range. The set was initialized to contain the number of keys equal to half of the range. Thus, by varying the key range, the initial size of the set may be effectively controlled.

FIGS. 10A-10F illustrate throughput results for AVL tree-based sets for various key ranges and mixes of operations, according to example embodiments. In these examples, the experiments are characterized by key range and the workload, and are specified as "workload, % Find, % Insert, % Remove". For example, the specification "8K, 60-20-20" denotes that the experiment was performed with the key range of 8K and the workload consisting of 60% Find operations, 20% Insert operations and 20% Remove operations. The results are normalized with the throughput of a lock-based single-threaded execution, representing relative speedup achieved by every approach. As expected, the benefits of the methods, techniques and/or mechanisms described herein (e.g., RW-TLE and FG-TLE) show up when the workload includes update operations. This may be because in read-only cases, the vast majority of all hardware transactions may succeed on the first attempt and the lock-based path is not used.

With update operations, some transactions may fail to the lock due to conflicts on data they access (i.e., tree nodes that get modified). The number of conflicts and the benefit of RW-TLE and/or FG-TLE correlates positively with the number of update operations and correlates negatively with the size of the set. (The latter may be because the smaller the set is, the more conflicts may be created on average by each update operation.) Note that even when a workload includes only Insert and Remove operations, only half of them, on average, may actually update the corresponding set, while the other half may skip the update since they may not find the key (in case of Remove) or since the key may already be in the set (e.g., in case of Insert).

Figure 10A:
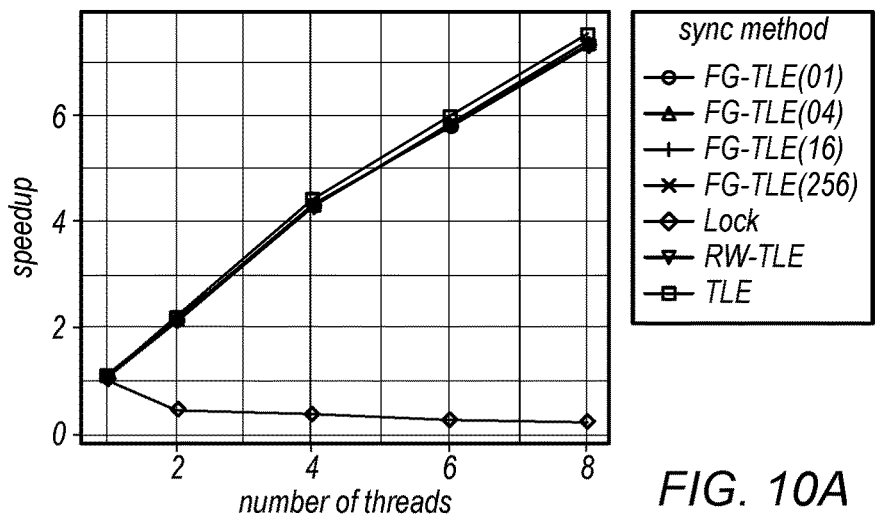
FIGS. 10A-10F illustrate throughput results for AVL tree-based sets for various key ranges and mixes of operations, according to at least some embodiments.
Figure 10B:
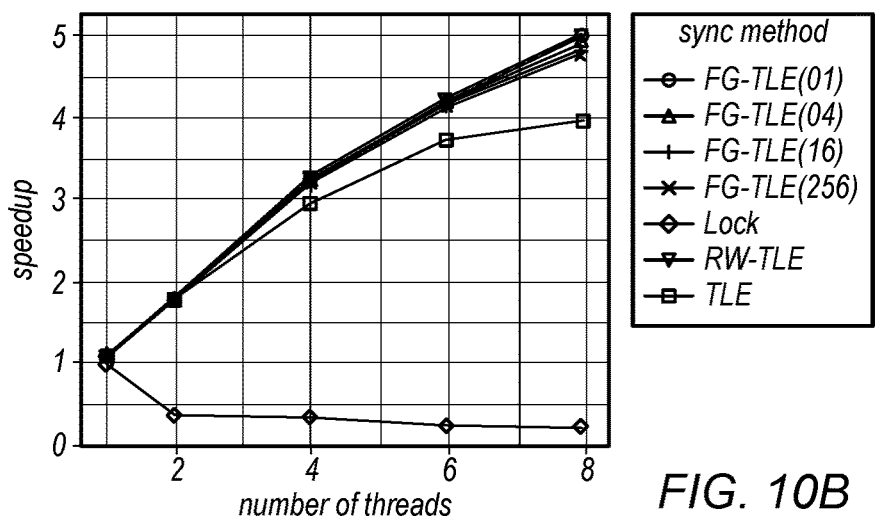
Figure 10C:
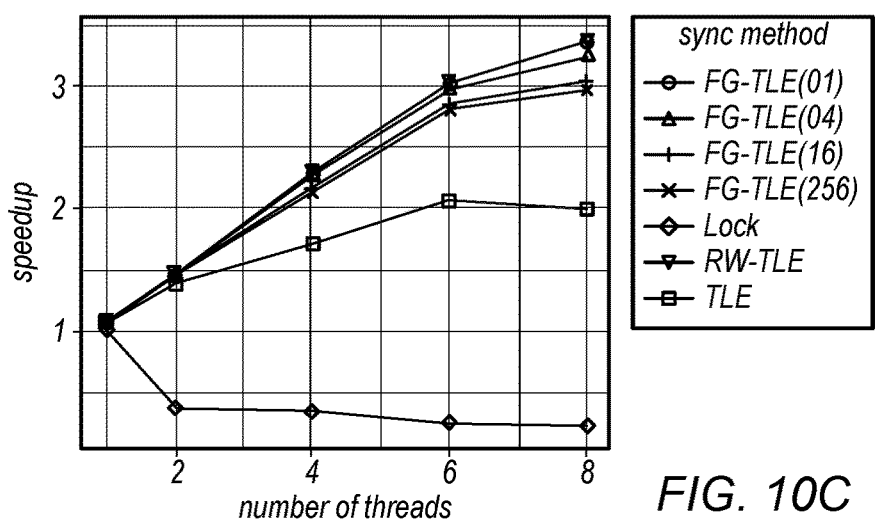
Figure 10D:
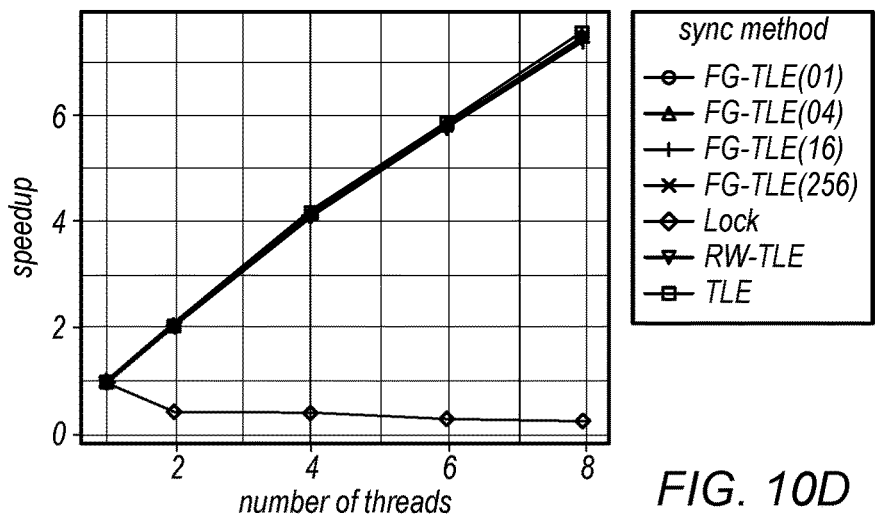
Figure 10E:
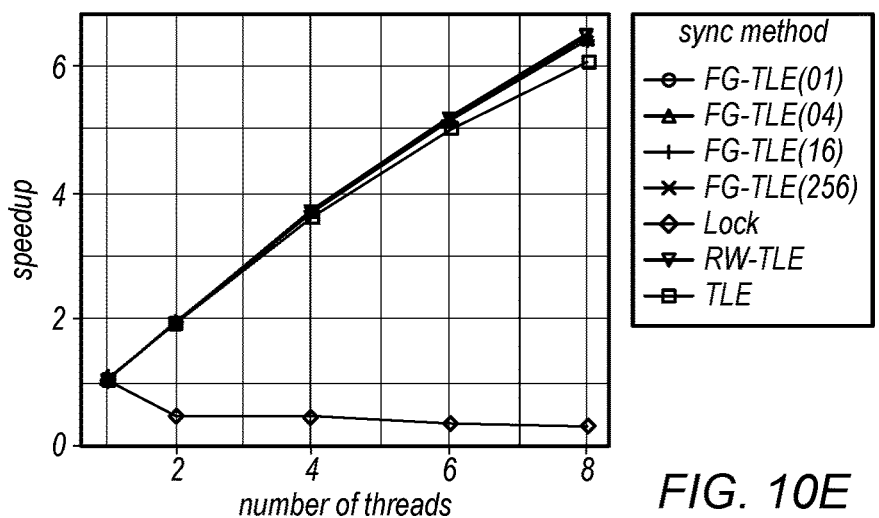
Figure 10F:
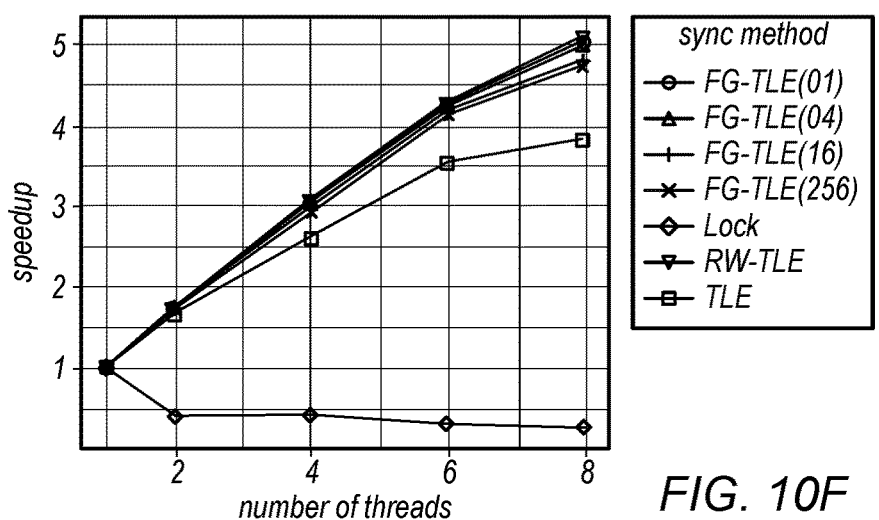

In addition to the throughput comparison, several observations may be drawn from the results in FIGS. 10A-10F. As noted above, these figures illustrate AVL tree-based set throughput normalized with the throughput of a lock-based single-threaded execution, according to example embodiments. These figures are characterized as follows: FIG. 10A: 8K, 100-0-0; FIG. 10B: 8K, 60-20-20; FIG. 10C: 8K, 0-50-50; FIG. 10D: 64K, 100-0-0; FIG. 10E: 64K, 60-20-20; FIG. 10F: 64K, 0-50-50.

According to the example embodiments illustrated in FIGS. 10A-10F, FG-TLE performed slightly better with a smaller size for orecs arrays, while the best performance was achieved by FG-TLE(1). Statistics were collected on the number of successful and failed attempts on fast and slow paths on HTM and Lock, as well as timing information about executions under the lock. Note that to reduce a probing effect, timing information was sampled randomly for less than 1% of executions under lock, on average.

Figure 11A:
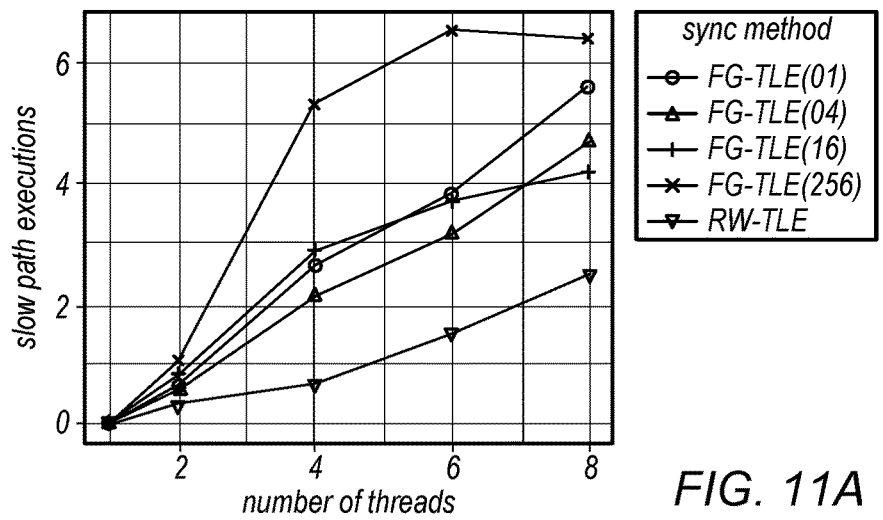
FIGS. 11A-11C illustrate performance statistics for an AVL tree-based set, according to at least some embodiments
Figure 11B:
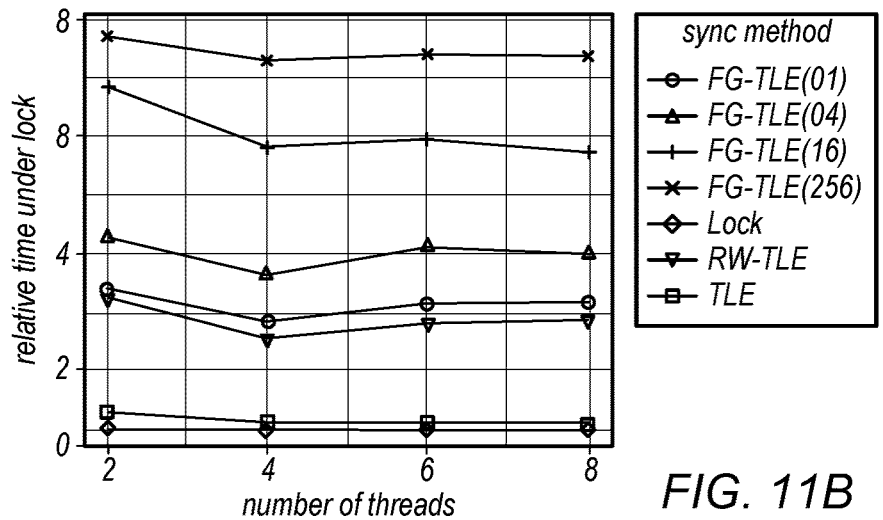
Figure 11C:
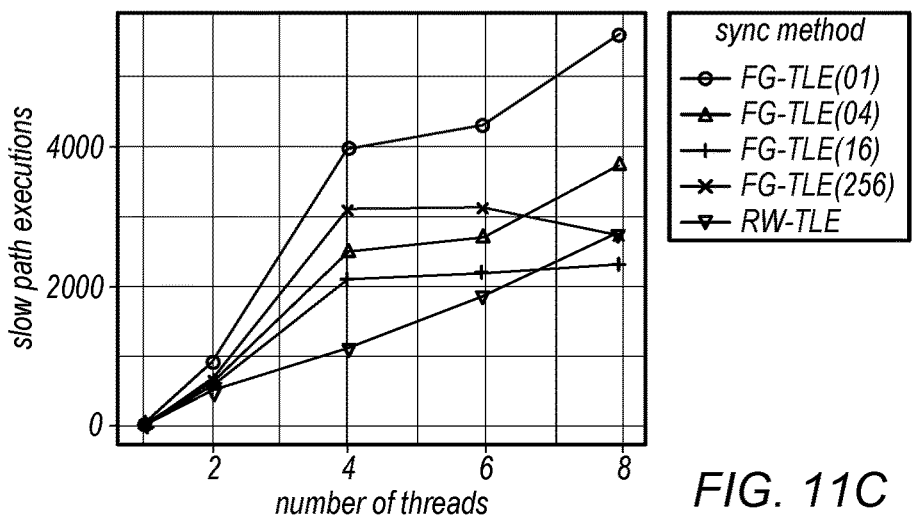

FIGS. 11A-11C depict some of those statistics using, as an example, the experiment with AVL tree-based set, key range of 8K and workload of 60% Find operations. In other words, FIGS. 10A-10C illustrate performance statistics for the AVL tree-based set, key range of 8K and workload composed of 60% Find, 20% Insert and 20% Remove operations. More specifically, FIG. 11A illustrates the number of successful speculative executions on the slow path per one execution under lock; FIG. 11B illustrates the execution time under lock normalized to the time measured for the lock-based execution with the same number of threads; and FIG. 11C illustrates the total number of successful speculative executions during the time the lock was held by a thread running on the slow path.

FIG. 11A shows the number of successful speculative executions on the slow path relatively to the number of executions under lock (that use the slow path as well) for concurrent TLE variants, according to example embodiments. Intuitively, the larger size of orecs arrays should allow more threads to succeed while speculating concurrently on the slow path. Indeed, there is a rough correlation between the size of orecs arrays and the statistic shown in FIG. 11A However, the larger size of orecs may also mean more overhead for executions under lock (including more memory barriers), according to some embodiments. For example, FIG. 11B shows the time spent by executions under lock in various TLE variants normalized by the time spent under lock using lock-based synchronization and the same number of threads. The results for single thread runs are not shown, as TLE variants almost did not fail to lock in these cases. A correlation between the size of orecs arrays and the incurred overhead for various FG-TLE variants is illustrated in FIG. 11B. RW-TLE that does not use orecs array may incur the smallest overhead, according to some embodiments. However, even though the barriers in RW-TLE may be particularly light-weight, an execution under the lock may spend almost 3× more time in RW-TLE compared to that in TLE, according to one example embodiment. This overhead may come from the fact that GCC does not seem to support in-lining of barriers used by libitm.

FIG. 11C shows the relation between the two previous statistics, depicting the number of successful executions on the slow path on HTM divided by the time spent by executions under the lock, according to one example embodiment. As discussed below, this statistic may be referred to as a "utility" measure. FIG. 11C shows a rough inversed correlation between utility and the size of orecs, according to one embodiment. In particular, even though FG-TLE(1) may have a lower number of successful executions on the slow HTM path per each lock acquisition compared to, e.g., FG-TLE(256) (as shown in FIG. 11A), its lower overhead of executions under the lock (as shown in FIG. 11B) may result in higher utility value. This may explain, in part, the higher throughput results achieved by FG-TLE(1) over other concurrent TLE variants, as shown in FIGS. 10A-10F and FIG. 12, according to various embodiments. Furthermore, the utility measure in FIG. 11C for most concurrent TLE variants may increase with the number of threads. Furthermore, the utility and performance advantages of the methods, techniques and/or mechanisms described herein (e.g., RW-TLE and FG-TLE) may grow even further on larger machines, according to some embodiments.

Figure 12:
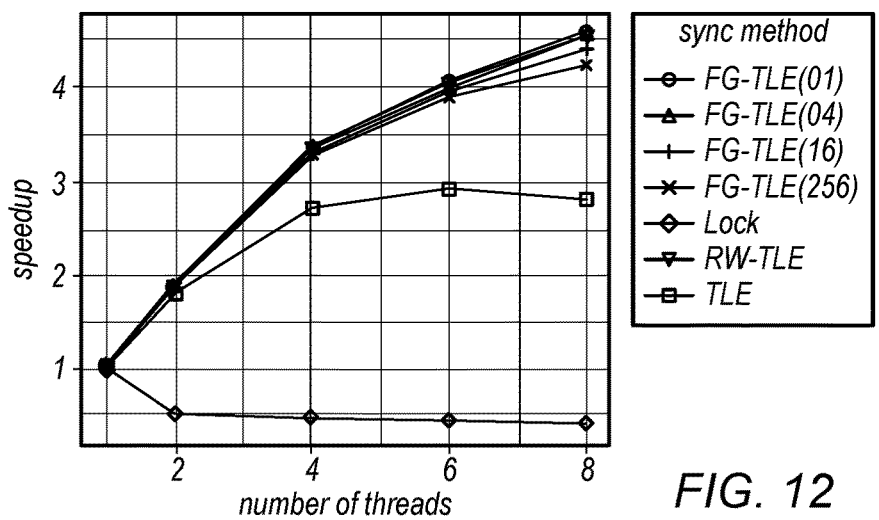
FIG. 12 illustrates a skip-lists-based set throughput normalized with the throughput of a lock-based single-threaded execution, according to at least some embodiments

The experiments with skip-lists-based sets show similar patterns to AVL trees-based sets, however the benefit of concurrent TLE over TLE may be even higher, according to example embodiments. As one example, FIG. 12 presents the results achieved with skip-lists-based sets with the range of 64K and no Find operations in one embodiment. In other words, FIG. 12 illustrates a skip-lists-based set throughput normalized with the throughput of a lock-based single-threaded execution, characterized as 64K, 0-50-50.

It is believed this is because skip lists generally use larger nodes (as they might have multiple next pointers on different levels). Thus a transaction might read a larger number of cache lines and may therefore have a higher chance to experience aborts due to capacity limits of HTM. Having more capacity aborts may help concurrent TLE (e.g., RW-TLE and/or FG-TLE) exploit the benefits of prefetching (e.g., failed attempts on the slow HTM path warm the cache for subsequent attempts on the fast HTM path and increase the chance for the latter to succeed), according to some embodiments.

Figure 13A:
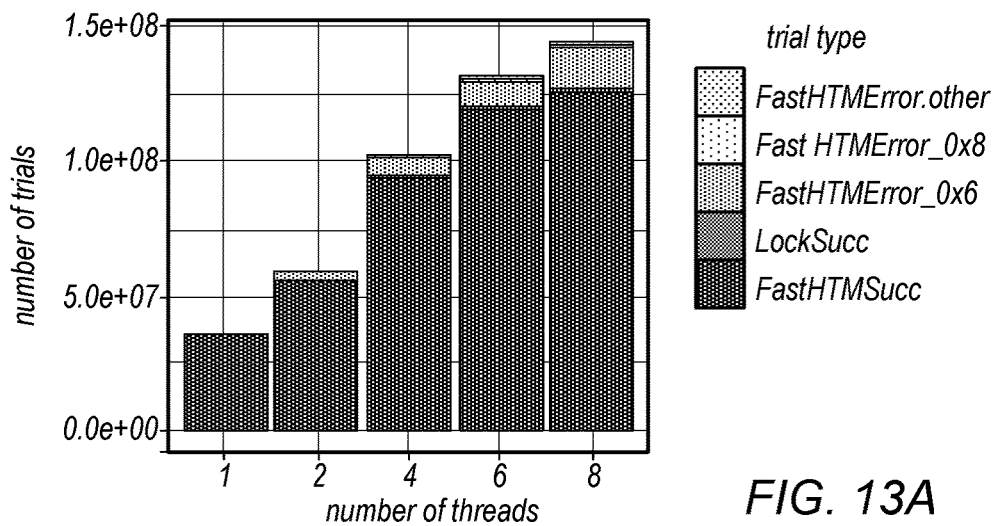
FIGS. 13A and 13B illustrate the distribution of execution attempts for TLE with an AVL tree-based set and skip-list-based set, respectively, according to at least some embodiments
Figure 13B:
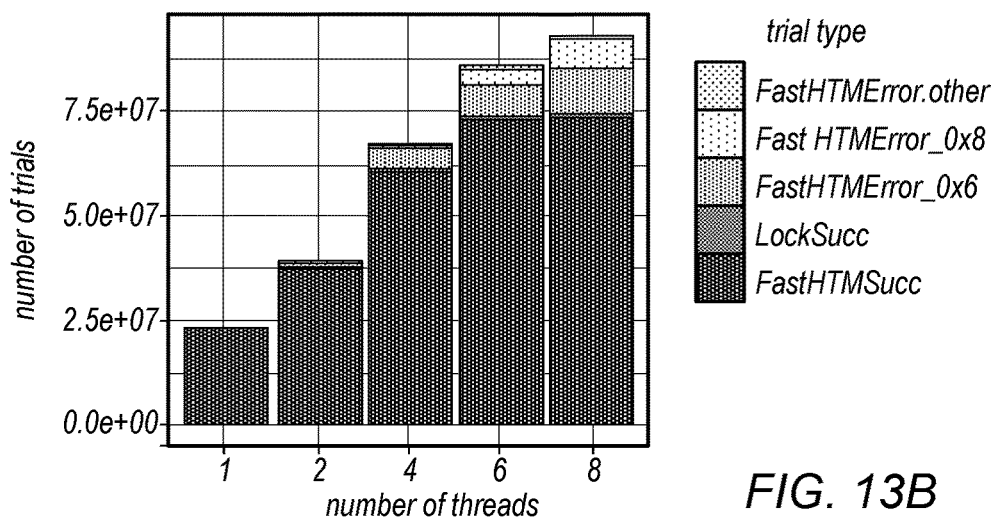

FIGS. 13A and 13B compare the distribution of HTM trials (including failed ones) made by TLE in experiments with AVL tree-based set and skip-list-based set, respectively, and the same workload as used in FIGS. 11A-11C. In other words, FIGS. 13A and 13B illustrate the distribution of execution attempts for TLE with AVL tree-based set (in FIG. 13A) and skip-list-based set (in FIG. 13B). Note that FastHTMError 0x6 specifies speculative trials on the fast path that ended up with data conflict abort, while FastHTMError 0x8 specifies capacity aborts. Here, both FIG. 13A and FIG. 13B may be characterized as 8K, 60-20-20. Thus, according to some embodiments, the ratio of capacity aborts may be higher for skip lists.

Experiments with Priority Queues

Figure 14A:
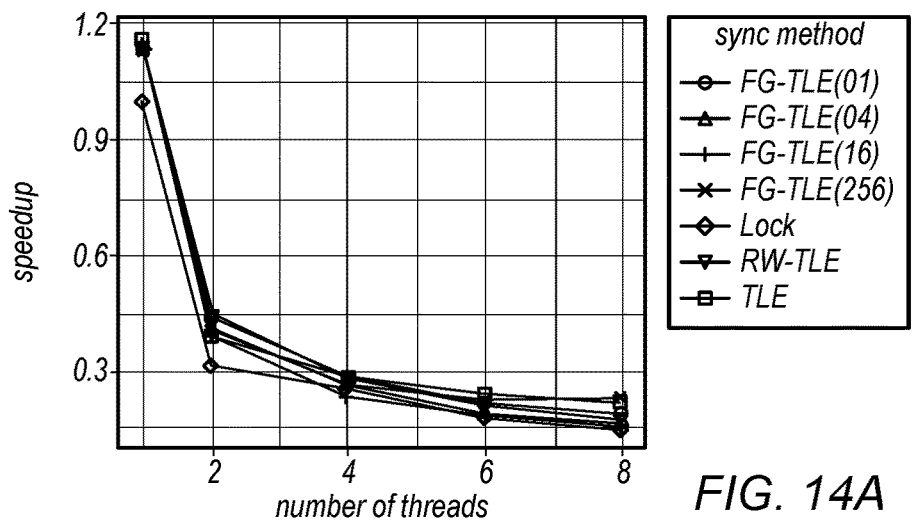
FIGS. 14A-14C illustrate priority queue results, according to at least some embodiments
Figure 14B:
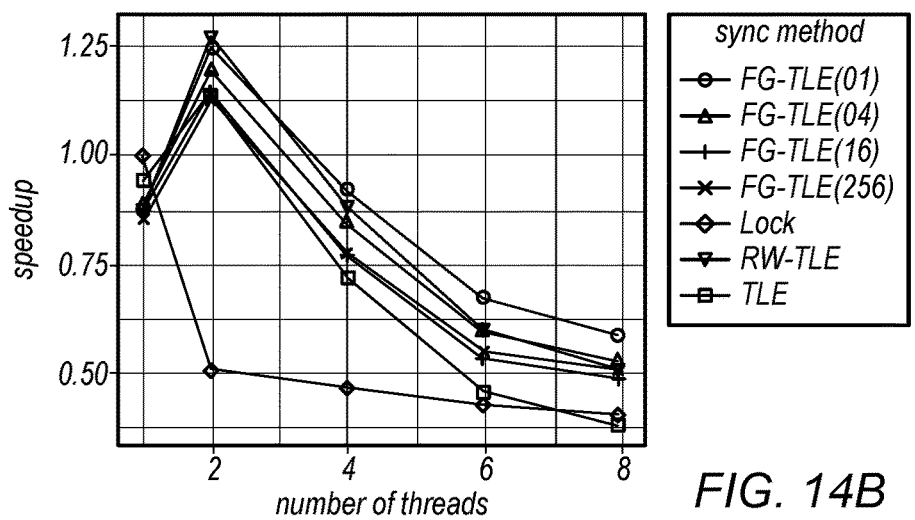
Figure 14C:
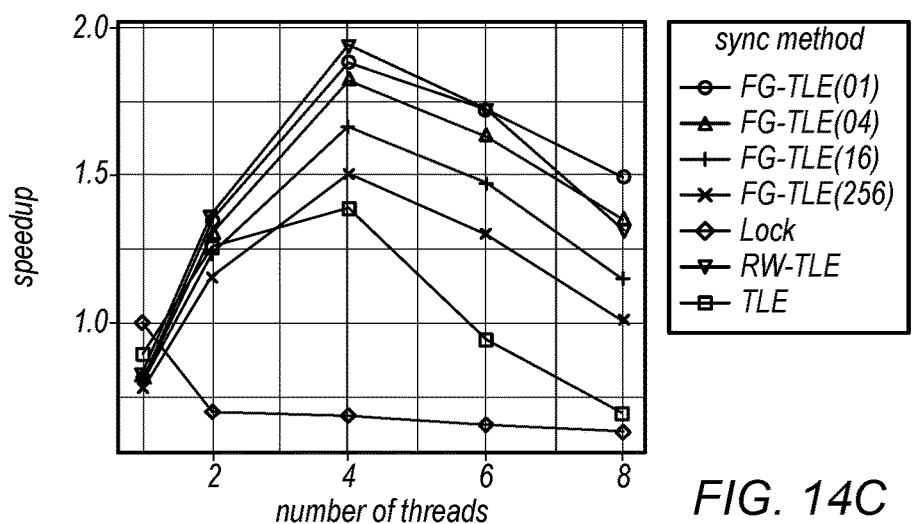

In experiments with priority queues based on skip lists, the full range of 32 bits was used to select random keys for queue initialization and for subsequent operations performed by the varying number of threads, according to example embodiments. As described in more detail below, FIGS. 14A-14C illustrate priority queue results for 50% Insert-50% RemoveMin experiments (in FIGS. 14A and 14B), and Insert-only experiments (in FIG. 14C), according to various embodiments. For 50-50 experiments, the initial size of the queue is 100K nodes in FIG. 14A and 1 M nodes in FIG. 14B. For Insert-only experiments (in FIG. 14C), the queue is initially empty.

FIGS. 14A and 14B presents results for experiment in which the queue is initialized with 100K and 1 M keys, respectively, and then threads perform Insert and RemoveMin operations with probability 50% for each, according to one embodiment. As a result, the size of the queue is kept roughly the same throughout the whole experiment. Note that in some embodiments, the same key to may be stored more than once in the priority queue, thus an Insert operation may always succeed in updating the queue.

FIGS. 14A and 14B show that in general, TLE and concurrent TLE variants may scale negatively in the evaluated data structure, according to some embodiments. This is not surprising as RemoveMin operation may be considered a bottleneck potentially causing many transactions to abort due to data conflicts. Yet, for larger queues (as in FIG. 13B), the TLE variants may scale for two threads and in general, speedups may be substantially higher than for smaller queues (such as those in FIG. 14A), according to some embodiments. For instance, Insert operations may keep threads busy longer (e.g., they may need to search for the insertion point in a larger list) and thus reduce contention in RemoveMin, according to some embodiments. In addition, larger lists may increase the chance that the insertion point of an Insert operation will be further from the head of the list, thereby possibly reducing the chance for contention between Insert and RemoveMin operations, according to one embodiment.

A few interesting phenomena come out when comparing the performance of concurrent TLE with traditional TLE in FIGS. 14A and 14B, First, for smaller queues (such as in FIG. 14A), FG-TLE(256) may performs better than other concurrent TLE alternatives. Additionally, FG-TLE(256) may perform better than traditional TLE at 8 threads. Thus, in this workload, a lesser number of conflicts between threads speculating on the slow path and a thread holding the lock may be more beneficial than the overhead created by a larger number of orecs used, according to some embodiments. Additionally, the number of self-aborts on the slow path due to orecs entries being updated by the thread under lock may be significantly lower for FG-TLE(256) as compared to other FG-TLE variants, according to various embodiments.

However, for embodiments involving larger queues, such as in FIG. 14B, all concurrent TLE variants may beat standard TLE with more than two threads. Moreover, the performance of FG-TLE may be better with a smaller size of orecs.

Additionally, as illustrated in FIG. 14A-14C, the performance of RW-TLE may benefit from an effect of prefetching made by futile transactions on the slow path helping subsequent transactions on the fast path to succeed, even though none of the transactions succeed on the slow path (as they always perform a write), according to one embodiment.

This effect may be apparent in larger queues where Insert operations may need to access more cache lines, on average, and thus may have a higher chance to experience a cache miss or abort due to capacity reasons. Concurrent TLE variants may exploit the fact that, unlike standard TLE, speculation may continue on the slow path, keeping the cache warm. This may be useful for implementations in which memory footprint is negligible, such as for RW-TLE according to one embodiment.

To estimate the effect of prefetching, another set of experiments was performed using only Insert operations. Here, the experiments start with an empty queue and then threads perform 1 M Insert operations with randomly chosen keys. The operations are divided equally between all threads. The time for the last thread to complete is measured, and throughput is calculated by dividing this time by the total number of operations performed (i.e., 1 M).

Throughput results in FIG. 14C show that all TLE variants may scale up to 4 threads and then may degrade as the number of conflicts between concurrent Insert operations increases, according to some embodiments. In some embodiments, concurrent TLE variants (e.g., RW-TLE, FG-TLE and adaptive FG-TLE) may perform better than standard TLE with 4 threads or more, echoing the results in FIG. 14B). Thus, performance benefits of concurrent TLE, as shown in FIG. 14C, may be derived from faster Insert operations involving prefetching resulting from speculative attempts on the slow path, according to some embodiments.

Computing System Example

Figure 15:
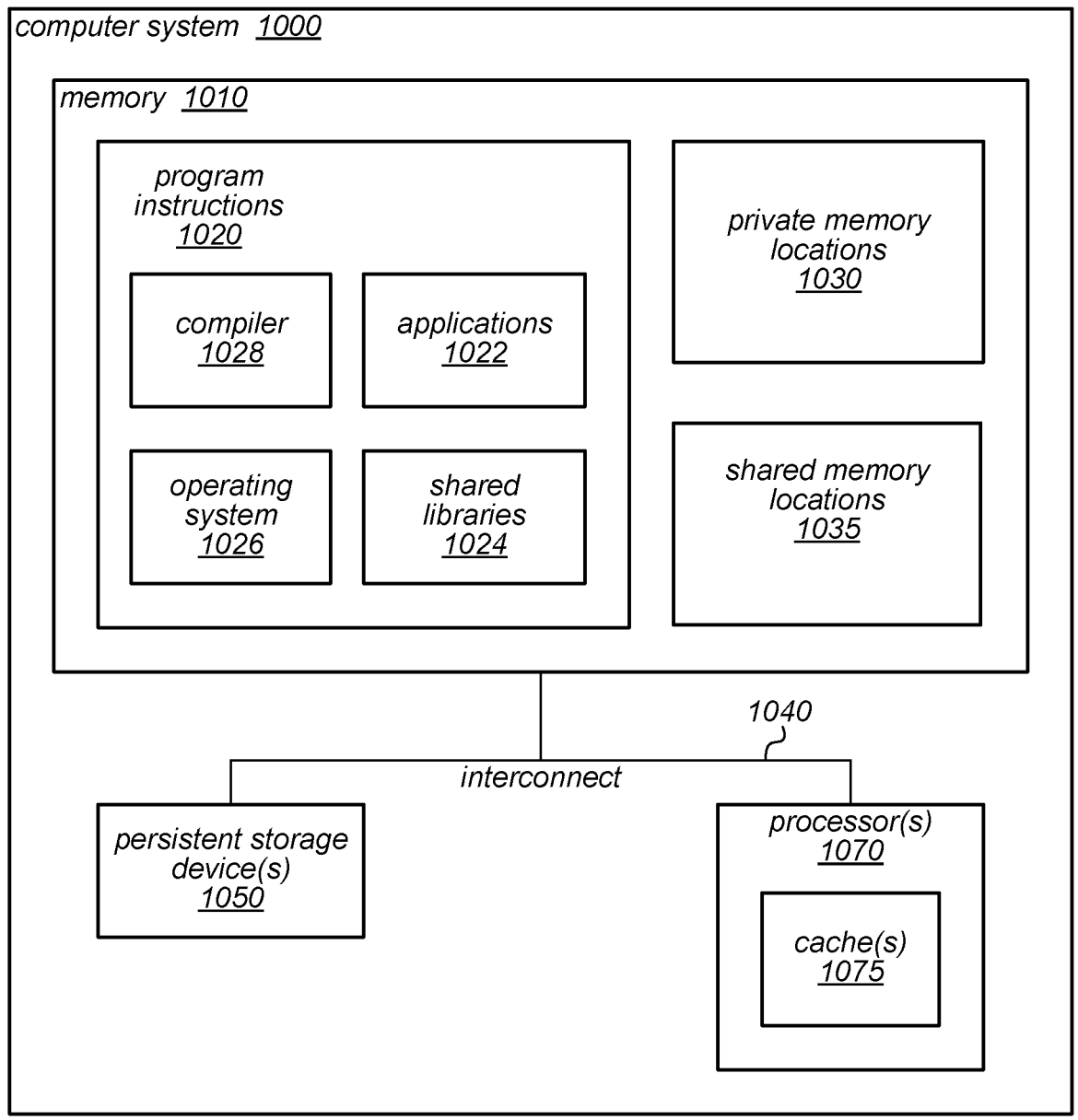
FIG. 15 is a block diagram illustrating a computing system configured to implement the disclosed techniques, according to various embodiments.

The systems and methods described herein may be implemented on or by any of a variety of computing systems, in different embodiments. FIG. 15 illustrates a computing system 1000 that is configured to implement the disclosed techniques, according to various embodiments. The computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

The mechanisms for implementing the techniques described herein, may be provided as a computer program product, or software, that may include a non-transitory, computer-readable storage medium having stored thereon instructions, which may be used to program a computer system 1000 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1000 may include one or more processors 1070; each may include multiple cores, any of which may be single or multi-threaded. For example, multiple processor cores may be included in a single processor chip (e.g., a single processor 1070), and multiple processor chips may be included in computer system 1000. Each of the processors 1070 may include a cache or a hierarchy of caches 1075, in various embodiments. For example, each processor chip 1070 may include multiple L1 caches (e.g., one per processor core) and one or more other caches (which may be shared by the processor cores on a single processor). The computer system 1000 may also include one or more persistent storage devices 1050 (e.g. optical storage, magnetic storage, hard drive, tape drive, solid state memory, etc.) and one or more system memories 1010 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 15 (e.g., video cards, audio cards, additional network interfaces, peripheral devices, a network interface such as an ATM interface, an Ethernet interface, a Frame Relay interface, etc.)

The one or more processors 1070, the storage device(s) 1050, and the system memory 1010 may be coupled to the system interconnect 1040. One or more of the system memories 1010 may contain program instructions 1020. Program instructions 1020 may be executable to implement one or more applications 1022 (which may include original or instrumented application source code and/or executable application code that includes one or more accesses to a critical section of code or shared resource that may be protected by lock, as described herein), shared libraries 1024 (which may include a library that supports transactional memory), or operating systems 1026. In some embodiments, program instructions 1020 may include a compiler 1028. In some embodiments, compiler 1028 may be an optimizing compiler that is configured to apply one or more transformations and/or optimizations to application or library code that is executable to implement the disclosed methods, techniques and/or mechanisms. In some embodiments, program instructions 1020 may be executable to implement compiled code configured to perform and/or implement concurrent TLE as described herein. In some embodiments, program instructions 1020 may also be configured to implement a transaction support library, which provides various methods for implementing atomic transactions using hardware transactional memory (HTM), software transactional memory (STM), hybrid transactional memories, RW-TLE, FG-TLE, and/or adaptive FG-TLE (e.g., within shared libraries 1024 or elsewhere within program instructions 1020). In some embodiments, a transaction support library may include functionality to execute transactions according to various hardware and/or software transactional memory techniques. For example, in some embodiments, applications 1022 may make calls into a transaction support library for beginning and ending (i.e., committing) transactions, and/or for performing one or more accesses to shared memory locations 1035 (e.g., locations within a shared transactional memory space) from within transactions, and/or calls into a library to support any or all of the techniques described herein.

Program instructions 1020 may be encoded in platform native binary, any interpreted language such as Java™ byte-code, or in any other language such as C/C++, Java™, etc. or in any combination thereof. In various embodiments, compiler 1028, applications 1022, operating system 1026, and/or shared libraries 1024 may each be implemented in any of various programming languages or methods. For example, in one embodiment, compiler 1028 and operating system 1026 may be JAVA based, while in another embodiment they may be written using the C or C++ programming languages. Similarly, applications 1022 may be written using Java, C, C++, or another programming language, according to various embodiments. Moreover, in some embodiments, compiler 1028, applications 1022, operating system 1026, and/shared libraries 1024 may not be implemented using the same programming language. For example, applications 1022 may be C++ based, while compiler 1028 may be developed using C.

The program instructions 1020 may include transactional memory support, operations, or procedures, and/or other processes for implementing the techniques described herein. Such support and functions may exist in one or more of the shared libraries 1024, operating systems 1026, or applications 1022, in various embodiments. The system memory 1010 may further comprise private memory locations 1030 and/or shared memory locations 1035 where data may be stored. For example, shared memory locations 1035 may include locations in a shared transactional memory space, which may support and/or be accessed by transactions in a software transactional memory implementation, a hardware transactional memory implementation, a hardware-software hybrid transactional memory implementation, a concurrent TLE implementation, a RW-TLE implementation, a FG-TLE implementation, and/or an adaptive FG-TLE implementation, in different embodiments. In some embodiments, shared memory locations 1035 may store data or other shared resources (e.g., lock data structures, including metadata, counters, and/or flags) that are accessible to multiple, concurrently executing threads, processes, or transactions, and that may be protected by one or more locks, in various embodiments. In addition, the system memory 1010 and/or any of the caches of processor(s) 1070 may, at various times, store recorded values of data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of lock structures, policies, and procedures particular, it should be noted that the techniques and mechanisms disclosed herein may be applicable in other contexts in which critical sections of code and/or shared resources may be protected by other types of locks/structures under different policies or procedures than those described in the examples herein. It is intended that the following claims be interpreted to embrace all such variations and modifications.

What is claimed:

1. A non-transitory, computer-readable storage medium storing program instructions that when executed on a computing device cause the computing device to perform:
   acquiring, by a first thread of a multi-threaded application, a lock associated with a portion of shared memory accessible by threads of the multi-threaded application, wherein while the lock is acquired by the first thread, the lock is unavailable to one or more other threads of the multi-threaded application; and
   in response to determining, by another thread of the one or more other threads of the multi-threaded application, that the lock is to be elided and is unavailable:
      beginning a hardware transaction subsequent to determining that the lock is to be elided and is unavailable;
      executing, by the other thread, an instrumented version of a critical section of code using the hardware transaction;
      wherein read operations and write operations of the instrumented version of the critical section are instrumented to detect data conflicts when accessing the portion of shared memory; and
      wherein the multi-threaded application includes both the instrumented version and an unmodified version of the critical section.

2. The non-transitory, computer-readable storage medium of claim 1, wherein the program instructions further cause the computing device to perform:
   wherein said executing the instrumented critical section comprises performing, by the other thread, one or more write accesses to the portion of shared memory;
   determining, by the other thread, whether or not the first thread performed any read or write accesses to the portion of shared memory, wherein said determining is performed according to one or more instrumented write operations performing the one or more write accesses; and
   in response to determining, by the other thread, that the first thread did not perform any read or write accesses to the portion of shared memory, committing the hardware transaction.

3. The non-transitory, computer-readable storage medium of claim 2, wherein the program instructions further cause the computing device to perform:
   in response to determining, by the other thread, that the first thread performed one or more read or write accesses to the portion of shared memory, aborting the hardware transaction.

4. The non-transitory, computer-readable storage medium of claim 3, wherein the program instructions further cause the computing device to perform:
   updating, by the first thread, an ownership record associated with the portion of shared memory to indicate that the first thread performed the one or more read or write accesses to the portion of shared memory; and
   wherein said determining whether the first thread has performed the one or more read or write accesses comprises detecting, by the other thread, that the ownership record was updated.

5. The non-transitory, computer-readable storage medium of claim 4, wherein the program instructions further cause the computing device to perform:
   wherein said updating the ownership records comprises storing, by the first thread, a current value of a global epoch counter to the ownership record;

storing, by the other thread, prior to said executing the instrumented version of the critical section, a snapshot value of a global epoch counter; and wherein said detecting, by the other thread, that the ownership record was updated comprises determining, by the other thread during execution of the instrumented version of the critical section, that the value stored in the ownership record is not less than the snapshot value.

6. The non-transitory, computer-readable storage medium of claim 1, wherein the program instructions further cause the computing device to perform:

wherein said executing the instrumented critical section comprises performing, by the other thread, one or more read accesses to the portion of shared memory; and determining, by the other thread, whether or not the first thread performed any write accesses to the portion of shared memory, wherein said determining is performed according to one or more instrumented read operations performing the one or more read accesses; and in response to determining, by the other thread, that first thread did not perform any write accesses to the portion of shared memory, committing the hardware transaction.

7. The non-transitory, computer-readable storage medium of claim 6, wherein the program instructions further cause the computing device to perform:

in response to determining, by the other thread, that the first thread performed one or more write accesses to the portion of shared memory, aborting the hardware transaction.

8. The non-transitory, computer-readable storage medium of claim 7, wherein the program instructions further cause the computing device to perform:

updating, by the first thread, an ownership record associated with the portion of shared memory to indicate that the first thread performed the one or more write accesses to the portion of shared memory; and wherein said determining whether the first thread has performed the one or more write accesses comprises detecting, by the other thread, that the ownership record was updated.

9. The non-transitory, computer-readable storage medium of claim 8, wherein the program instructions further cause the computing device to perform:

wherein said updating the ownership records comprises storing, by the first thread, a current value of a global epoch counter to the ownership record;

storing, by the other thread, prior to said executing the instrumented version of the critical section, a snapshot value of a global epoch counter;

wherein said detecting, by the other thread, that the ownership record was updated comprises determining, by the other thread during execution of the instrumented version of the critical section, that the value stored in the ownership record is not less than the snapshot value.

10. A computer implemented method, comprising:

acquiring, by a first thread of a multi-threaded application, a lock associated with a portion of shared memory accessible by threads of the multi-threaded application, wherein while the lock is acquired by the first thread, the lock is unavailable to one or more other threads of the multi-threaded application; and in response to determining, by another thread of the one or more other threads of the multi-threaded application, that the lock is to be elided and is unavailable:

beginning a hardware transaction subsequent to determining that the lock is to be elided and is unavailable;

executing, by the other thread, an instrumented version of a critical section of code using the hardware transaction;

wherein read operations and write operations of the instrumented version of the critical section are instrumented to detect data conflicts when accessing the portion of shared memory; and wherein the multi-threaded application includes both the instrumented version and an unmodified version of the critical section.

11. The method of claim 10, further comprising:

wherein said executing the instrumented critical section comprises performing, by the other thread, one or more write accesses to the portion of shared memory;

determining, by the other thread, whether or not the first thread performed any read or write accesses to the portion of shared memory, wherein said determining is performed according to one or more instrumented write operations performing the one or more write accesses; and in response to determining, by the other thread, that the first thread did not perform any read or write accesses to the portion of shared memory, committing the hardware transaction.

12. The method of claim 11, further comprising:

in response to determining, by the other thread, that the first thread performed one or more read or write accesses to the portion of shared memory, aborting the hardware transaction.

13. The method of claim 12, further comprising:

updating, by the first thread, an ownership record associated with the portion of shared memory to indicate that the first thread performed the one or more read or write accesses to the portion of shared memory; and wherein said determining whether the first thread has performed the one or more read or write accesses comprises detecting, by the other thread, that the ownership record was updated.

14. The method of claim 13, further comprising:

wherein said updating the ownership records comprises storing, by the first thread, a current value of a global epoch counter to the ownership record;

storing, by the other thread, prior to said executing the instrumented version of the critical section, a snapshot value of a global epoch counter; and wherein said detecting, by the other thread, that the ownership record was updated comprises determining, by the other thread during execution of the instrumented version of the critical section, that the value stored in the ownership record is not less than the snapshot value.

15. The method of claim 10, further comprising:

wherein said executing the instrumented critical section comprises performing, by the other thread, one or more read accesses to the portion of shared memory; and determining, by the other thread, whether or not the first thread performed any write accesses to the portion of shared memory, wherein said determining is performed according to one or more instrumented read operations performing the one or more read accesses; and in response to determining, by the other thread, that first thread did not perform any write accesses to the portion of shared memory, committing the hardware transaction.

16. The method of claim 15, further comprising:

in response to determining, by the other thread, that the first thread performed one or more write accesses to the portion of shared memory, aborting the hardware transaction.

17. The method of claim 16, further comprising:

updating, by the first thread, an ownership record associated with the portion of shared memory to indicate that the first thread performed the one or more write accesses to the portion of shared memory; and wherein said determining whether the first thread has performed the one or more write accesses comprises detecting, by the other thread, that the ownership record was updated.

18. The method of claim 17, further comprising:

wherein said updating the ownership records comprises storing, by the first thread, a current value of a global epoch counter to the ownership record;

storing, by the other thread, prior to said executing the instrumented version of the critical section, a snapshot value of a global epoch counter;

wherein said detecting, by the other thread, that the ownership record was updated comprises determining, by the other thread during execution of the instrumented version of the critical section, that the value stored in the ownership record is not less than the snapshot value.

19. A computing device, comprising:

a processor; and a memory comprising program instructions, that when executed on the processor cause the processor to:

acquire, by a first thread of a multi-threaded application, a lock associated with a portion of shared memory accessible by threads of the multi-threaded application, wherein while the lock is acquired by the first thread, the lock is unavailable to one or more other threads of the multi-threaded application;

in response to determining, by another thread of the one or more other threads of the multi-threaded application, that the lock is to be elided and is unavailable:

begin a hardware transaction subsequent to determining that the lock is to be elided and is unavailable;

execute, using the hardware transaction, an instrumented version of a critical section of code;

wherein read operations and write operations of the instrumented version of the critical section are instrumented to detect data conflicts when accessing the portion of shared memory; and wherein the multi-threaded application includes both the instrumented version and an unmodified version of the critical section;

perform, by the other thread within the critical section, one or more write accesses to the portion of shared memory;

detect, by other thread using the hardware transaction and according to one or more instrumented write operations performing the one or more write accesses, that the first thread did not perform any read or write accesses to the portion of shared memory; and commit the hardware transaction.

20. The computing device of claim 19, wherein to detect that the first thread did not perform any read or write accesses to the portion of shared memory, the program instructions further cause the processor to:

determine, by the other thread, that an ownership record associated with the portion of shared memory indicates that the first thread did not perform any read or write accesses to the portion of shared memory.

* * * * *

UNITED STATES PATENT AND TRADEMARK OFFICE
CERTIFICATE OF CORRECTION

PATENT NO. : 10,534,538 B2  
APPLICATION NO. : 15/050393  
DATED : January 14, 2020  
INVENTOR(S) : Kogan et al.

Page 1 of 1

It is certified that error appears in the above-identified patent and that said Letters Patent is hereby corrected as shown below:

In the Drawings

On sheet 7 of 15, in FIG. 7, under Reference Numeral 704, Line 1, delete "perfoms" and insert -- performs --, therefor.

On sheet 9 of 15, in FIG. 9, under Reference Numeral 904, Line 1, delete "perfoms" and insert -- performs --, therefor.

In the Specification

In Column 3, Line 25, delete "embodiments" and insert -- embodiments. --, therefor.

In Column 3, Line 28, delete "embodiments" and insert -- embodiments. --, therefor.

In Column 3, Lines 31-32, delete "embodiments" and insert -- embodiments. --, therefor.

In Column 3, Line 34, delete "embodiments" and insert -- embodiments. --, therefor.

In Column 14, Line 25, delete "and or" and insert -- and/or --, therefor.

In Column 25, Line 12, delete "11A" and insert -- 11A. --, therefor.

In Column 27, Line 14, delete "FIG." and insert -- FIGS. --, therefor.

Signed and Sealed this  
Twenty-third Day of March, 2021

Drew Hirshfeld  
*Performing the Functions and Duties of the*  
*Under Secretary of Commerce for Intellectual Property and*  
*Director of the United States Patent and Trademark Office*